(12) United States Patent
Maurer

(10) Patent No.: US 9,223,302 B2
(45) Date of Patent: Dec. 29, 2015

(54) METHOD AND SYSTEM FOR CONTROLLING ELECTRIC ACTUATORS

(71) Applicant: Parker-Hannifin Corporation, Cleveland, OH (US)

(72) Inventor: Garrett Maurer, Maplewood, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/242,070

(22) Filed: Apr. 1, 2014

(65) Prior Publication Data

US 2014/0214283 A1 Jul. 31, 2014

Related U.S. Application Data

(63) Continuation of application No. PCT/US2012/058547, filed on Oct. 3, 2012.

(60) Provisional application No. 61/542,929, filed on Oct. 4, 2011.

(51) Int. Cl.
*B60R 22/00* (2006.01)
*E05F 15/00* (2015.01)
(Continued)

(52) U.S. Cl.
CPC . *G05B 15/02* (2013.01); *B60S 9/02* (2013.01); *H02P 29/00* (2013.01); *H02P 29/0044* (2013.01); *B60S 9/04* (2013.01); *B60S 9/10* (2013.01)

(58) Field of Classification Search
CPC ............. B60W 2510/0291; B60W 10/26; B60W 10/02; B60W 10/10; B60W 20/20; B60L 2210/20; B60L 11/123; B60L 15/20; B60L 3/06; B60L 2240/441; B60L 11/14; B60L 3/106; B60L 7/18; B60L 7/26; B60L 11/08; B60G 2300/04; B60G 17/0165; B60G 17/018; B60G 17/0195; B60G 17/065; B60G 15/06; B60G 11/20; H02P 27/04; H02P 15/00; H02P 3/04; H02P 29/00; H02P 29/0044
USPC ............. 701/49, 41, 36, 54, 68, 69, 1, 44, 37, 701/22, 50, 70, 38, 43, 45, 48; 180/444, 180/274, 338, 365, 408, 65.265

See application file for complete search history.

(56) References Cited

U.S. PATENT DOCUMENTS 3,603,613 A * 9/1971 Erdmann .................... 280/5.514
3,857,582 A 12/1974 Hartog
(Continued)

FOREIGN PATENT DOCUMENTS

JP 2007300750 11/2007
JP 2009240117 10/2009

OTHER PUBLICATIONS

International Search Report and Written Opinion for corresponding International Application No. PCT/US2012/058547 mailed Jan. 1, 2014.

(Continued)

*Primary Examiner* — Calvin Cheung
*Assistant Examiner* — Luis A Martinez Borrero
(74) *Attorney, Agent, or Firm* — Renner, Otto, Boisselle & Sklar, LLP

(57) ABSTRACT

An object 10 includes an electric actuator system 11 and a method 12. The object 10 may be a vehicle that includes wheels 18-21. The system 11 and method 12 include microprocessor based controllers 32, 33 and 37, electric actuators 22-25, 38 and 39, and a user interface 34 with an integrated level sensor and temperature sensor. The system 11 and method 12 operate to automatically or manually move the vehicle 10 from a not level attitude to a level attitude when the vehicle 10 is parked. The system 11 and method 12 in a preferred embodiment (FIGS. 4-6) may be configured to utilize any number of substantially identical controllers and actuators. The system 11 and method 12 sense the load carried by each actuator, to assure the wheels of the vehicle are not carrying more than a desired amount of the load when the vehicle is parked.

23 Claims, 22 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *G05B 15/02* | (2006.01) | |
| *H02P 29/00* | (2006.01) | |
| *B60S 9/02* | (2006.01) | |
| *B60S 9/04* | (2006.01) | |
| *B60S 9/10* | (2006.01) | |

(56) References Cited

U.S. PATENT DOCUMENTS

| | | | |
|---|---|---|---|
| 4,017,099 A | 4/1977 | Hegel et al. | |
| 4,061,309 A | 12/1977 | Hanser | |
| 4,105,216 A | 8/1978 | Graham et al. | |
| 4,164,664 A | 8/1979 | Kasiewicz | |
| 4,391,452 A | 7/1983 | Ohmori | |
| 4,572,527 A | 2/1986 | Stafford-Mills | |
| 4,709,934 A | 12/1987 | Suzuki et al. | |
| 4,743,037 A | 5/1988 | Hanser | |
| 4,746,133 A | 5/1988 | Hanser et al. | |
| 4,784,400 A | 11/1988 | Hofius | |
| 4,887,359 A | 12/1989 | Hofius | |
| 5,143,386 A | 9/1992 | Uriarte | |
| 5,159,989 A | 11/1992 | Claxton | |
| 5,188,379 A | 2/1993 | Krause et al. | |
| 5,580,095 A | 12/1996 | Fukumoto | |
| 5,676,385 A | 10/1997 | Schneider et al. | |
| 5,865,453 A * | 2/1999 | Harada et al. | 280/124.161 |
| 5,890,721 A | 4/1999 | Schneider et al. | |
| 5,901,969 A | 5/1999 | Schneider et al. | |
| 5,915,700 A | 6/1999 | Schneider et al. | |
| 6,050,573 A | 4/2000 | Kunz | |
| 6,161,844 A * | 12/2000 | Charaudeau et al. | 280/5.515 |
| 6,176,495 B1 | 1/2001 | Decker | |
| 6,446,980 B1 * | 9/2002 | Kutscher et al. | 280/5.508 |
| 6,584,385 B1 | 6/2003 | Ford | |
| 6,848,693 B2 | 2/2005 | Schneider | |
| 6,885,924 B2 | 4/2005 | Ford et al. | |
| 6,918,600 B2 * | 7/2005 | Dodd et al. | 280/5.508 |
| 7,000,927 B2 | 2/2006 | Bell | |
| 7,025,178 B2 | 4/2006 | Wengelski et al. | |
| 7,025,361 B1 | 4/2006 | Erickson | |
| 7,029,014 B2 * | 4/2006 | Hamm | 280/5.502 |
| 7,226,057 B2 | 6/2007 | Eichhorn et al. | |
| 7,287,760 B1 * | 10/2007 | Quick et al. | 280/5.512 |
| 7,389,994 B2 | 6/2008 | Trudeau et al. | |
| 7,407,189 B2 | 8/2008 | Hiebert et al. | |
| 7,607,667 B2 | 10/2009 | Brookes et al. | |
| 7,644,938 B2 * | 1/2010 | Yamada | 280/86.758 |
| 7,706,942 B2 * | 4/2010 | Miyajima | 701/37 |
| 7,744,099 B2 | 6/2010 | Holbrook | |
| 7,926,600 B2 | 4/2011 | Flynn et al. | |
| 7,962,261 B2 * | 6/2011 | Bushko et al. | 701/37 |
| 8,028,783 B2 * | 10/2011 | Rust | 180/89.14 |
| 8,191,874 B2 * | 6/2012 | Inoue et al. | 267/64.24 |
| 8,195,361 B2 * | 6/2012 | Kajino et al. | 701/38 |
| 8,244,440 B2 * | 8/2012 | Ingenbleek et al. | 701/51 |
| 8,655,577 B2 * | 2/2014 | Stender | 701/124 |
| 2002/0084599 A1 * | 7/2002 | Charaudeau et al. | 280/5.5 |
| 2002/0116104 A1 * | 8/2002 | Kawashima et al. | 701/37 |
| 2004/0094913 A1 | 5/2004 | Flynn et al. | 280/6.153 |
| 2004/0176889 A1 * | 9/2004 | Capito | 701/37 |
| 2005/0021205 A1 * | 1/2005 | Niwa et al. | 701/37 |
| 2005/0098964 A1 * | 5/2005 | Brown | 280/5.5 |
| 2005/0280219 A1 * | 12/2005 | Brown | 280/5.5 |
| 2006/0012144 A1 * | 1/2006 | Kunzler et al. | 280/124.125 |
| 2006/0047387 A1 * | 3/2006 | Izawa et al. | 701/37 |
| 2006/0048976 A1 * | 3/2006 | Deguchi et al. | 180/6.5 |
| 2006/0081420 A1 | 4/2006 | Ford et al. | |
| 2006/0104766 A1 | 5/2006 | Ford et al. | |
| 2007/0113070 A1 * | 5/2007 | Lackritz | 713/151 |
| 2007/0180719 A1 | 8/2007 | Donnelly et al. | |
| 2008/0100021 A1 * | 5/2008 | Yamada | 280/124.127 |
| 2008/0142768 A1 | 6/2008 | Thorpe et al. | |
| 2008/0315538 A1 | 12/2008 | Ogle | |
| 2009/0001679 A1 * | 1/2009 | Kajino et al. | 280/124.106 |
| 2009/0085309 A1 * | 4/2009 | Hirao et al. | 280/5.503 |
| 2009/0138126 A1 | 5/2009 | Marsh et al. | |
| 2009/0248247 A1 * | 10/2009 | Furuichi et al. | 701/37 |
| 2009/0314566 A1 * | 12/2009 | Rust | 180/89.14 |
| 2010/0100280 A1 | 4/2010 | Flynn et al. | |
| 2010/0123568 A1 * | 5/2010 | Namuduri et al. | 340/438 |
| 2010/0230876 A1 * | 9/2010 | Inoue et al. | 267/140.14 |
| 2010/0308291 A1 | 12/2010 | Krones | |
| 2011/0024706 A1 | 2/2011 | Schwindaman et al. | |
| 2011/0169231 A1 | 7/2011 | Tiedge | |
| 2012/0053788 A1 * | 3/2012 | Amino et al. | 701/37 |
| 2012/0116634 A1 * | 5/2012 | Inoue et al. | 701/37 |
| 2012/0306170 A1 * | 12/2012 | Serbu et al. | 280/5.514 |
| 2013/0030650 A1 * | 1/2013 | Norris et al. | 701/40 |
| 2013/0304327 A1 * | 11/2013 | Morishita et al. | 701/43 |
| 2014/0265170 A1 * | 9/2014 | Giovanardi et al. | 280/5.5 |
| 2014/0288776 A1 * | 9/2014 | Anderson et al. | 701/37 |
| 2014/0297116 A1 * | 10/2014 | Anderson et al. | 701/37 |
| 2015/0006027 A1 * | 1/2015 | Maurer | 701/36 |

OTHER PUBLICATIONS

IPRP for corresponding International Application No. PCT/US2012/058547 mailed Apr. 8, 2014.

ML49311; Sensing Unit Adjustment Precision Leveling System, Sep. 22, 2011, Taken from the Internet on Dec. 21, 2011 from http://www.hwhcorp.com/ml49311.pdf.

* cited by examiner

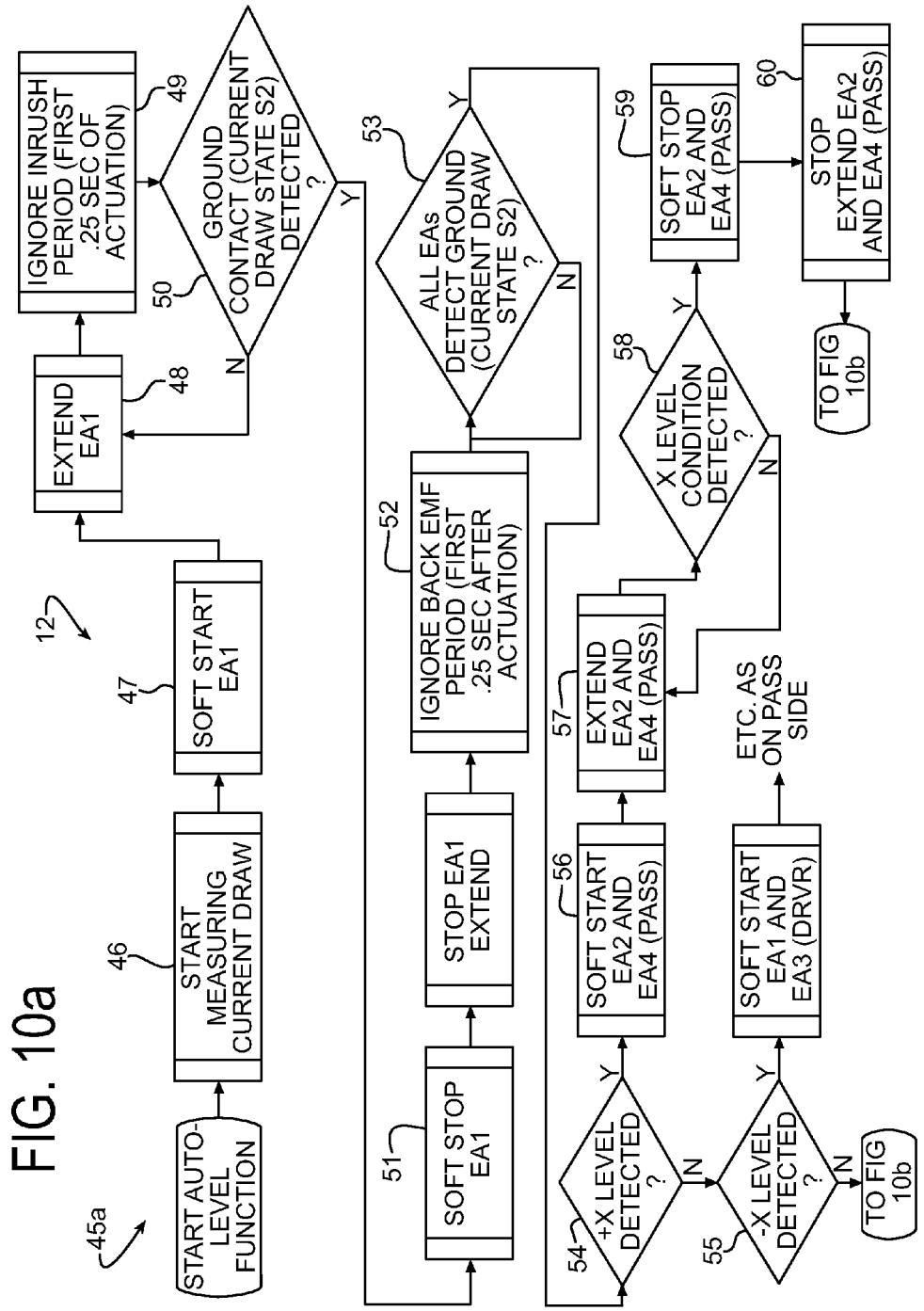

METHOD AND SYSTEM FOR CONTROLLING ELECTRIC ACTUATORS

CROSS REFERENCE TO RELATED APPLICATIONS

The present application is a continuation application of International PCT Patent Application PCT/US2012/058547, filed on Oct. 3, 2012, which claimed the benefit of the filing date of U.S. Provisional Patent Application Ser. No. 61/542,929 filed Oct. 4, 2011, the disclosures of which are incorporated herein by reference in its entirety.

TECHNICAL FIELD

This invention relates generally to electro-hydraulic and electro-mechanical actuator control systems and control methods. More specifically, this invention relates to electric actuator control systems and methods with condition sensing associated with the actuator. Still more specifically, this invention relates to such systems and methods used with multiple electric actuators to control the attitude of an object.

BACKGROUND OF THE INVENTION

Single or multiple electric actuators are frequently arranged in a system and use a method with a microprocessor based controller that controls electrical current supplied to the electric actuator(s) to control extension and retraction of the actuator(s). The term "electric actuator" means electro-hydraulic actuator and/or electro-mechanical actuator. The term "electro-hydraulic actuator" means a self-contained actuator that converts electrical energy to hydraulic energy and applies the hydraulic energy to cause motion. A typical electro-hydraulic actuator, for example, includes an electric motor that drives a hydraulic pump to pressurize fluid from a reservoir and supply the pressurized fluid to a hydraulic cylinder or other hydraulic motor to cause motion. The term "electro-mechanical actuator" means a self-contained actuator that converts electrical energy to mechanical energy to cause motion. A typical electro-mechanical actuator, for example, includes an electric motor that drives a mechanical rod through a mechanism such as a screw thread to cause motion. Such systems and methods are used in a wide range of stationary equipment and mobile equipment. One example of this type of system and method is used with mobile equipment to set and hold a platform for the equipment or other object in a predetermined attitude. The term "attitude" means the orientation or inclination of the axes of the object relative to a plane such as a horizontal plane or vertical plane, and the term "level attitude" means the orientation of the axes of the object in a plane substantially parallel to a horizontal plane.

One example of such system and method used with mobile equipment is a leveling system and method used with motorized or towed recreational vehicles. Generally, when recreational vehicles are to be parked for an extended period of time, a set of leveling electric actuators are utilized to level and support the vehicle. The most common types of leveling electric actuators, which are most commonly installed by the recreational vehicle manufacturer, are of a scissor type or telescoping type. Typically, such leveling electric actuators are used at both the front and the rear of the recreational vehicle and are extended to level the vehicle. The leveling electric actuators attach, often permanently, to the frame of the recreational vehicle to support the vehicle above the ground or other surface on which the recreational vehicle is parked.

Once the recreational vehicle is driven to the location where it will be parked, such as for example a campground or sporting event, the leveling electric actuators are engaged to raise the recreational vehicle, to take much of the weight off of the vehicle's tires and to support the vehicle in a generally level attitude. Sometimes the electric actuators may be extended individually and then checked and reset to obtain a proper level attitude.

In control systems and methods used with single or multiple electric actuators, a technical problem is presented if only some of the electric actuators carry a substantial part of the load. For example, recreational vehicle or other object leveling systems that use multiple electric actuators to position the vehicle or other object in a level attitude can level the object with only some of the actuators carrying a substantial part of the total object weight or load. This may occur, for example, if one side of the recreation vehicle is lower relative to ground than the other side of the vehicle. In this example, the electric actuators on the lower side may be extended to lift the lower side and achieve a level attitude for the vehicle while the actuators on the higher side are not carrying the proper part of the total vehicle weight or load. If this occurs, the tires on the high side of the vehicle and possible even the tires on the low side of the vehicle may carry a greater part of the weight than desired. If the tires carry too much of the weight when the vehicle is parked, even if the vehicle is in a level attitude, the vehicle may sway in a side-by-side direction or shift in a front-to-back direction due to the movement of occupants inside the vehicle or due to wind or other causes. To address this problem, some prior art recreational vehicle leveling systems may use a central hydraulic pump that supplies hydraulic fluid to multiple hydraulic actuators attached to the frame of the vehicle, with a pressure sensor to indicate a hydraulic pressure level in all of the actuators that indicates all of the actuators are carrying a substantial part of the load before leveling the vehicle is completed. Other prior art systems are disclosed in U.S. Pat. No. 5,143,386. These systems sense ground contact using a Hall effect current sensor and bring the actuators to a stop when each is lifting a minimum load and the vehicle has reached a level position.

It is desirable in single or multiple electric actuator control systems and methods to sense the load carried by the actuator(s) and provide an extending or retracting electrical current to the actuator(s) that achieves preselected load requirements. Further, in such systems and methods, it is desirable to sense the load carried by the actuator(s) and extend or retract the actuator(s) after a preselected minimum load is achieved to achieve a further objective such as positioning an object in a level attitude. Still further, in such systems and methods, it is desirable to have the ability to relatively easily increase or decrease the number of electric actuators provided so that the system can be used in a wide variety of applications.

It would be desirable to provide such a system and method in which an abrupt change in the velocity of movement of the actuator, such as for example by action of the operator or by the actuator starting or reaching the end of its stroke or encountering an abrupt increased resistance to its movement, would not cause objectionable erratic movement or jerking. Further, it would be desirable to provide such a system and method that would operate satisfactorily over a wide range of temperature conditions. Further, it would be desirable to provide such a system and method in which precise synchronization or tuning of the system for transient conditions would not be required to minimize such erratic movement or jerking. Still further, it would be desirable to provide such a system hick hydraulic motor position sensors or load or pressure sensors to measure the actuator condition would not be required.

SUMMARY OF THE INVENTION

The present invention provides an electric actuator system and a method for controlling an electric actuator(s), and various aspects of the invention provide a solution to the technical problems described above in the Background. At least one embodiment of the invention assures that the actuator(s) are properly loaded before a final position (such as a level attitude of an object) is reached, over a wide range of operating temperatures. Jerking or erratic movement is minimized, and automatic and manual operation are provided in an integrated method and system. System and method changes may be made with more or fewer actuators, to allow the system and method to be used in many different applications with the same component parts and the same system architecture. Precise synchronizing or tuning of the system is not required.

At least one embodiment of the invention provides a leveling system including a plurality of actuators mounted on an object to be leveled, a level sensor positioned on the object to be leveled, an input/output operator interface, and a controller communicating with the input/output operator interface, the plurality of actuators, and the level sensor to actuate the plurality of actuators in a manner leveling the object. A load sensor connected to the controller communicates the load carried by each actuator to assure each actuator is properly loaded when the object is leveled. A temperature sensor connected to the controller communicates operating temperature to the controller, and the controller integrates the operating temperature to determine the load over a wide range of temperatures.

At least one embodiment of the invention further provides a method of controlling an electric actuator that includes providing an electric controller in electric communication with the electric actuator, applying an initial electrical current determined by the controller to the actuator to cause movement of the actuator, sensing the load carried by the actuator and communicating the load to the controller, and applying a further electrical current to the actuator to cause further movement of the actuator only when the sensed load carried by the actuator exceeds a preset minimum load. The method may further include sensing the amount of electrical current supplied to the actuator to sense the load carried by the actuator, sensing the temperature of the actuator, combining the sensed temperature with the sensed electrical current to determine the load carried by the actuator, and ignoring the amount of electrical current supplied to the actuator during an initial predetermined time period of the initial electrical current.

This Summary is not intended to identify key features or essential features of the claimed subject matter, and these and other features of the invention are more fully described and particularly pointed out in the description and claims set out below. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

Embodiments of this invention will now be described in further detail with reference to the accompanying drawings, in which:

FIGS. 10a and 10b are a flow chart showing an automatic leveling portion of the flow chart illustrated in FIG. 9;

DETAILED DESCRIPTION OF THE DRAWINGS

Figure 1:
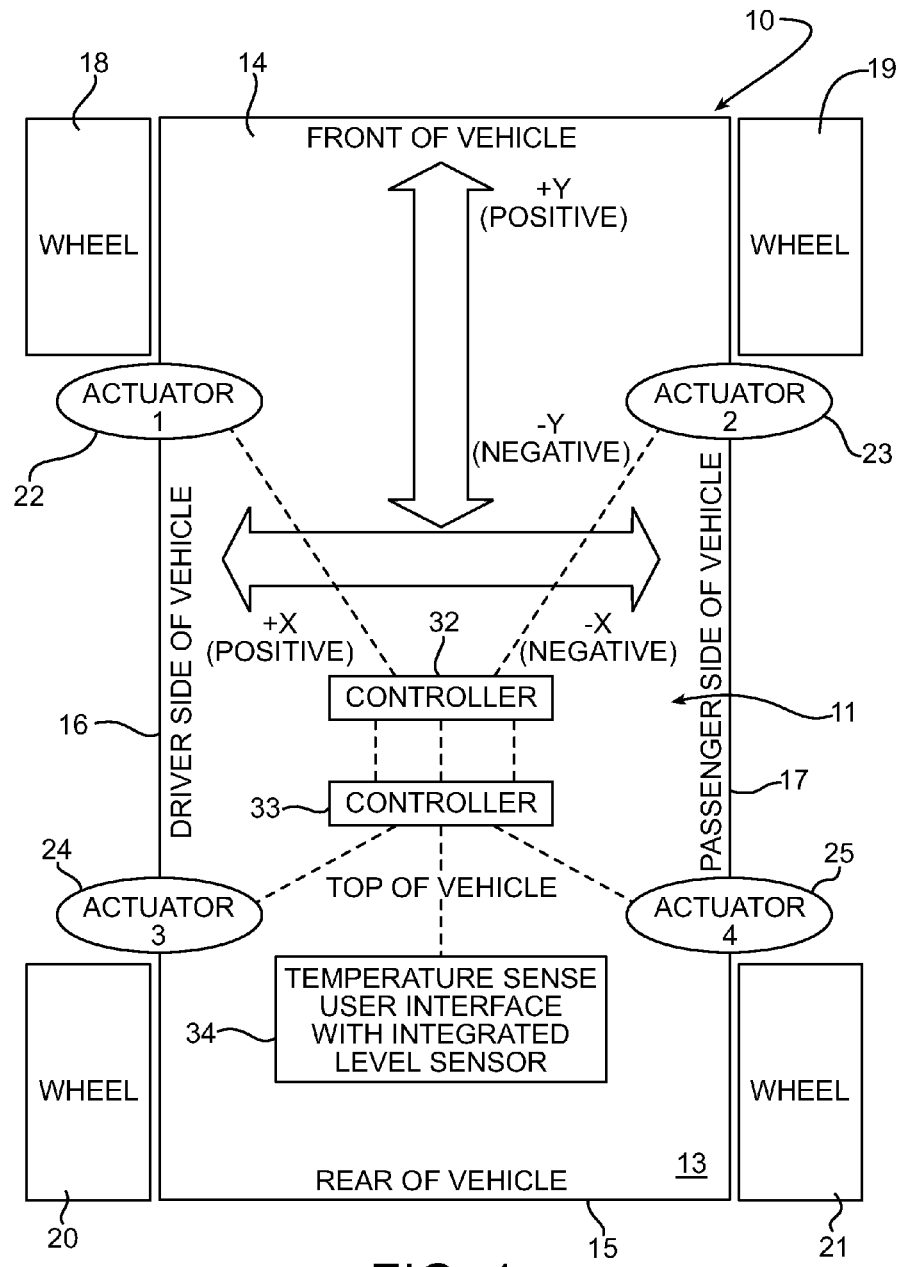
FIG. 1 is a schematic representation of a wheeled land vehicle that includes the method and system according to a preferred embodiment of the present invention, with the vehicle viewed from the top.

Referring now to the drawings in greater detail, FIGS. 1-13 illustrate an object 10 having an electric actuator system 11 that operates according to a method 12, all according to a preferred embodiment of the present invention. The object 10 can be any object that is to be moved with controlled movement, and in the preferred embodiment the object 10 is, for example, a motorized recreational land vehicle 10 that transports humans and cargo on roadways and provides lodging when the vehicle 10 is parked. The electric actuator system 11 can be used in a wide variety of applications to move objects, and in the preferred embodiment the system 11 is, for example, a leveling system for moving the recreational vehicle 10 to a substantially level attitude when the vehicle 10 is to be parked for an extended period of time.

Figure 2:
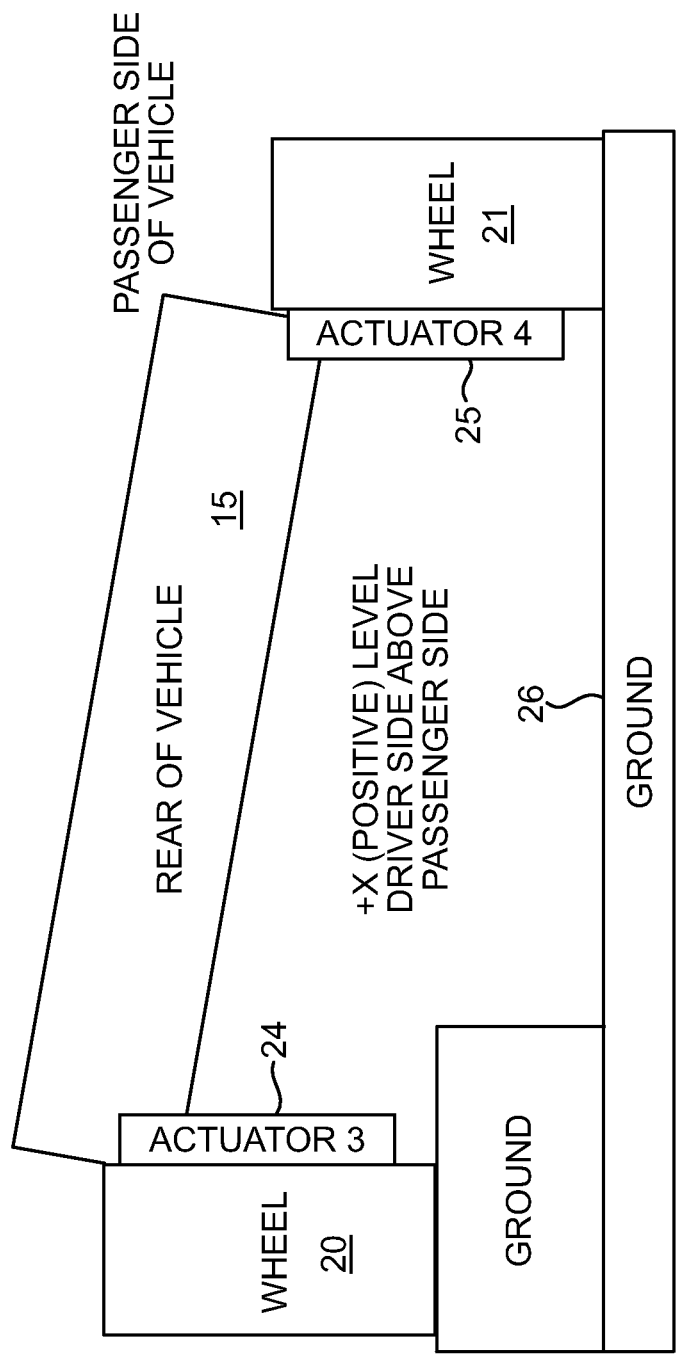
FIG. 2 is a side view of the vehicle illustrated in FIG. 1.
Figure 3:
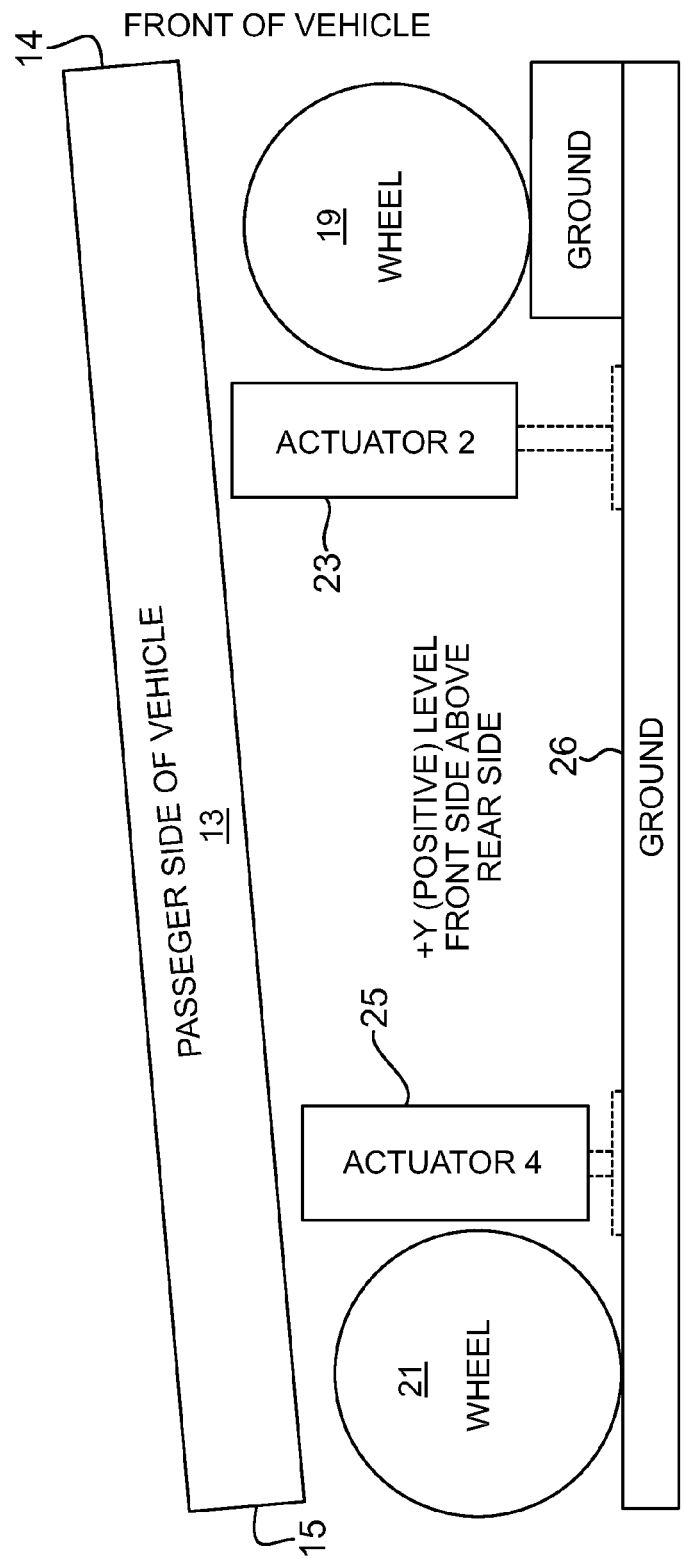
FIG. 3 is a rear view of the vehicle illustrated in FIG. 1.

Referring to FIGS. 1-3, the vehicle 10 includes a frame and body combination 13, a front 14, a rear 15, a passenger side 16, a driver side 17, and wheels 18-21. The electric actuator system 11 includes electric actuators 22-25 that are each permanently affixed to the frame at any suitable location, such as, for example, near each of the wheels 18-21. The actuators 22-25 are preferably identical to one another, and in the embodiments described below are identical to one another except as otherwise described. The electric actuators may be of any type, and in the preferred embodiment each actuator 22-25 is, for example, an electro-hydraulic actuator having an integral electric motor, hydraulic pump, and hydraulic cylinder (shown schematically in FIG. 22). When electrical power is supplied to the electric motor, the electric motor drives the hydraulic pump to pump hydraulic fluid to one side of the hydraulic cylinder. The hydraulic cylinder of each actuator 22-25 extends a base (illustrated in FIG. 3 in dotted outline for actuators 23 and 25) in a downward direction to engage the ground 26 and raise the vehicle 10, or retracts in an upward direction to lower the vehicle and move away from the ground 26, depending upon the rotation direction of the electric motor and the flow direction of the hydraulic fluid. Electro-hydraulic actuators of this type are well known, and the electric motor, hydraulic pump, and hydraulic cylinder, and base are not shown in detail in the drawings. Other types of electro-hydraulic actuators or electro-mechanical actuators may be used in place of the described actuators 22-25 of the preferred embodiment illustrated in the drawings.

As further illustrated in FIGS. 1-3, when the vehicle 10 is parked, the ground 26 or other surface on which the wheels 18-21 rest is often not level about the vehicle's side to side or X axis 27 or about its front to back or Y axis 28. As illustrated in FIG. 2, as viewed from the rear of the vehicle 10, when the driver side 17 is at a higher elevation or attitude relative to the passenger side 16, a condition about the X axis 27 exists that is referred to as +X. Similarly, when the passenger side 16 is at a higher elevation or attitude relative to the driver side 17, a condition (not shown in the drawings) about the X axis 27 exists that is referred to as −X. As illustrated in FIG. 3, as viewed from the passenger side of the vehicle 10, when the front 14 is at a higher elevation or attitude relative to the rear 15, a condition about the Y axis 28 exists that is referred to as +Y. Similarly, when the rear 15 is at a higher elevation or attitude relative to the front 16, a condition (not shown in the drawings) about the Y axis 28 exists that is referred to as −Y. When any condition of the parked vehicle 10 exists that is characterized by +X, −X, +Y, and/or −Y, or any combination thereof, the vehicle leveling system 11 and method 12 operate to move the vehicle 10 from that condition to a level attitude condition.

Referring now to FIGS. 1-4, the electric actuator system 11 further includes a first control module or microprocessor based controller 32, a second control module or microprocessor based controller 33, and a user interface 34. The controllers 32 and 33 each include input/output connections described further below. The user interface 34 includes, for example, an LCD screen or other text capable screen for user feedback by the system 11 and control buttons described below (or a screen that is a touch screen to provide the button functions) to enable user input to the controllers 32 and 33. The user interface 34 also includes an integral level attitude sensor and an integral temperature sensor, and the level attitude sensor and temperature sensor may alternatively be separate components. The level sensor may be of any desired type, and in the preferred embodiment the level sensor may be a known three axis accelerometer sensor that permits the level sensor to be mounted in a variety of orientations. The temperature sensor may also be of any desired type. Both the level sensor and the temperature sensor play a role in the system 11 and method 12 as further discussed below. The temperature sensor senses the ambient temperature outside the vehicle, to approximate the temperature of each of the actuators 22-25. Temperature sensors connected to sense the individual operating temperatures of the actuators could alternatively be used, but this additional complexity is typically not cost justified. A battery 35 provides electrical power to the system 11. If desired, the controller 33 can be programmed to interface with parking brake and air bag controls 36 or other controls of the vehicle 10, for example, to assure the vehicle parking brake is actuated and the air bags are disabled or that other conditions are met when the leveling system 11 is to be used. Wiring harness connections illustrated in the drawings by lines or boxes with double arrows provide suitable two way electrical connections between these components and the electric actuators 22-25, and certain of these wire harnesses could alternatively be replaced with wireless connections. The connections illustrated in FIG. 4 include controller area network communication (CAN Comm), power (PWR), positive (pos) and negative (neg).

The controller 32 is programmed to carry out the method 12 described more fully below to control electric actuators 22 and 23, and controller 33 is programmed in a similar manner to carry out the method 12 to control actuators 24 and 25. The controllers 32 and 33 are identical to one another from a hardware standpoint and are only slightly different in their software programs to accommodate the slightly different functions and connections illustrated in FIG. 4 and/or described below.

Figure 5:
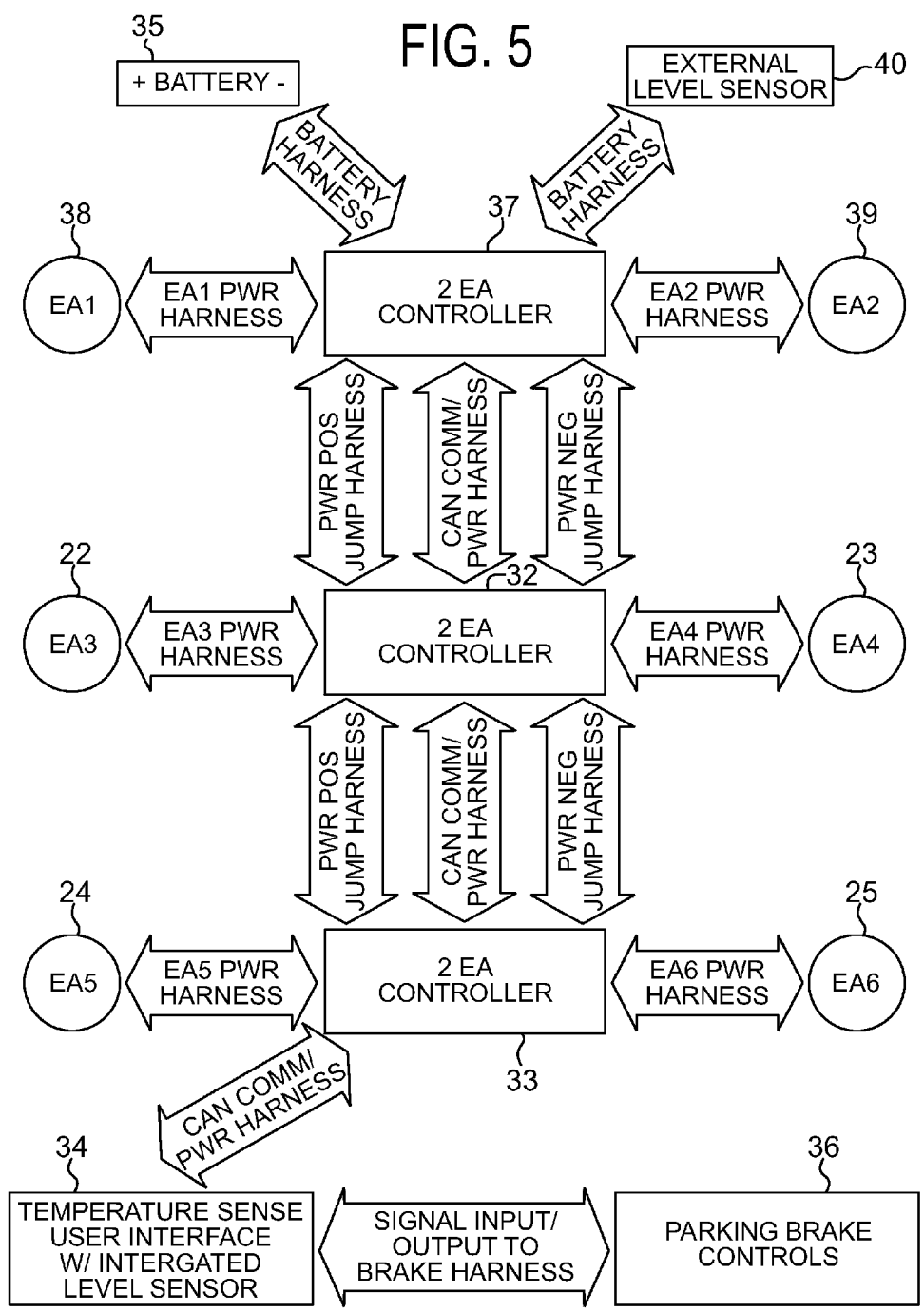
FIG. 5 illustrates a system and method according to the preferred embodiment of the present invention, using six electric actuators.
Figure 6:
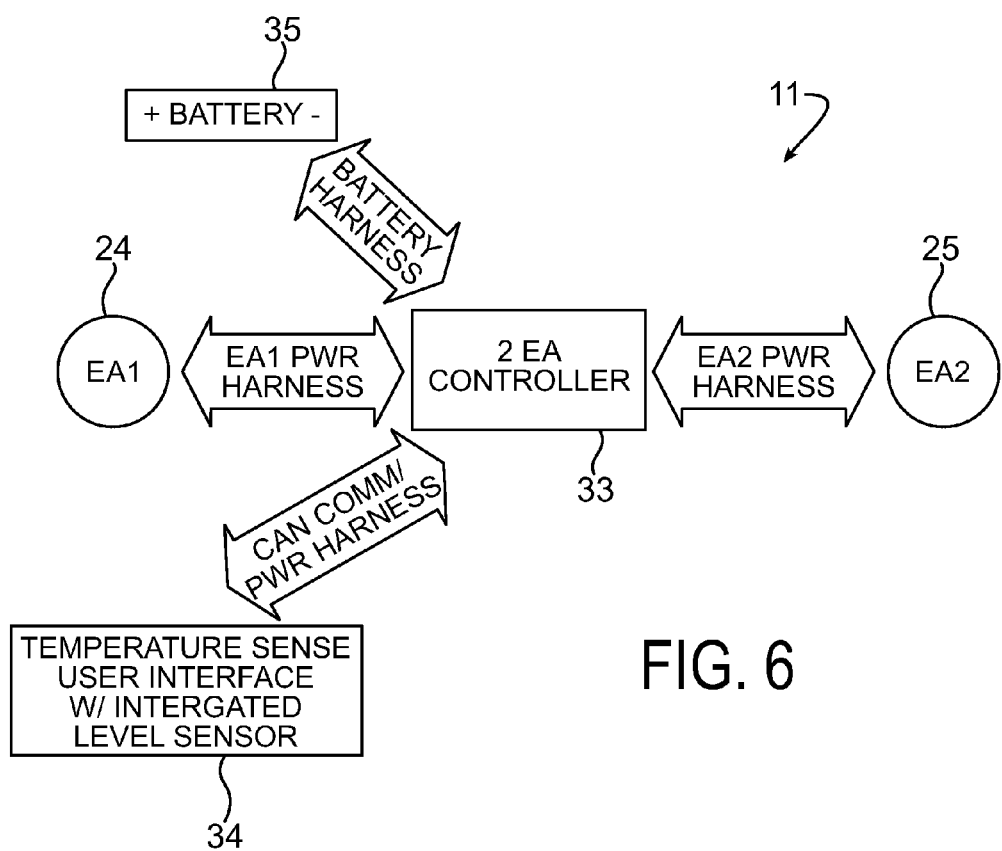
FIG. 6 illustrates a system and method according to the preferred embodiment of the present invention, using two electric actuators.

In some applications for the actuator system 1 it may be desirable to provide more than the four electric actuators 22-25 illustrated in FIGS. 1-4, and in other applications y be desirable to provide fewer than the four actuators 22-25. For example, in some applications such as relatively large land vehicle trailers known as fifth wheel trailers, the frame of the vehicle might not be as rigid as the frame of the motorized vehicle 10 so that the use of six electric actuators rather than four may be desirable. In other relatively smaller vehicles such as small land trailers, it may be desirable to use only two electric actuators. The system 11 and method 12 according to the present invention allow these changes while using controllers and a user interface that are identical from a hardware standpoint and while using wiring harnesses and electric actuators and temperature sensors and level sensors that are also identical. FIG. 5 illustrates an application for the system 11 and method 12, in which six electric actuators are used. In this application, a third controller 37, which again is identical to the controllers 32 and 33 from a hardware standpoint, is added along with two additional electric actuators 38 and 39 which are preferably larger than actuators 22-25. As shown in FIG. 5, the user interface 34 is optionally connected to the auxiliary vehicle controls 36. Also, an external level sensor 41 may be added in the event the size and flexibility of the vehicle require a different location for the level sensor than the location at the user interface 34, and in this case the above described integrated level sensor at the user interface 34 may be disabled. FIG. 6 illustrates an application for the system 11 and method 12, in which only one controller 33 and only two electric actuators 24 and 25 are used. With the system 11 and method 12 according to the preferred embodiment of the invention, reduced costs and increased flexibility are achieved by providing an expandable system and method that do not require different controllers or different harnesses and other components for different systems with different numbers of electric actuators.

The load carried by each actuator 22-25 (and also by actuators 38 and 39 when six actuators are used) is determined by measuring the electrical current drawn by and supplied to each electric actuator, combined with the sensed temperature. The sensed current is provided as an input to the actuator's respective controller 32, 33 or 37 along with the temperature sensed by the integrated temperature sensor in the user interface 34 described above. The controller is instructed to combine the sensed current with the sensed temperature to determine when a substantial load is carried by each actuator, to avoid leveling the vehicle 10 in an unstable condition such as could occur as mentioned above when one or more of the wheels are carrying more than a predetermined desired part of the load or weight of the vehicle when the system 11 and method 12 is leveling the vehicle. This unstable condition can occur because the wheels are not rigidly connected to the frame of the vehicle but instead are connected through springs and suspension components, and weight changes in the vehicle such as by the occupants moving inside the vehicle or by wind could cause the vehicle frame to move relative to the wheels if the vehicle frame itself were not rigidly supported on the ground 26 by the electric actuators.

Figure 7:
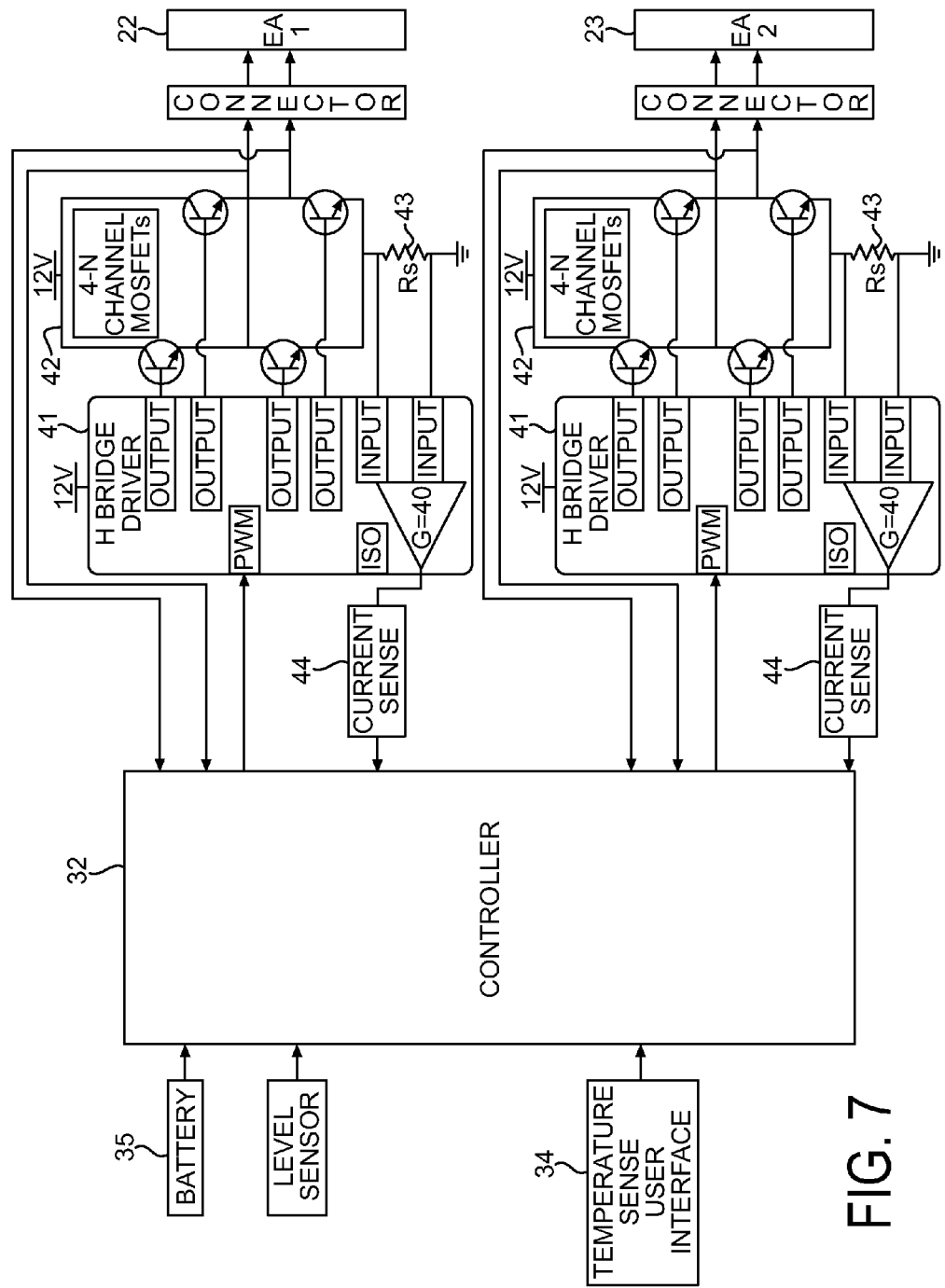
FIG. 7 is an electrical current sensing schematic for the method and system according to the preferred embodiment of the present invention.

The current sensing portion or subsystem of the system 11 and method 12 for the electric actuators 22 and 23 as provided to their associated controller 32 is illustrated in FIG. 7. The current sensing portion of the system 11 and method 12 for each of the other electric actuators illustrated in FIGS. 1-6 and their associated controller is identical to that shown in FIG. 7. As shown in FIG. 7, an H bridge driver 41 receives a pulse width modulation (PWM) input from the controller 32 and provides a stepped up output through a 4-N channel metal oxide semiconductor field effect transistor (MOSFET) 42 to the electric actuators 22 and 23. A shunt resistor 43 has a voltage drop and current flow that is proportional to the current provided to the actuators 22 and 23 to provide a current sense signal 44 that is provided as an input to the controller 32. If desired, two single pole double throw mechanical electric relays may be used in place of the MOSFETs.

Figure 8A:
FIG. 8a is a graph showing the relationship between a monitored signal from each electric actuator and the load carried by each actuator in the system and method according to the preferred embodiment of the present invention.
Figure 8B:
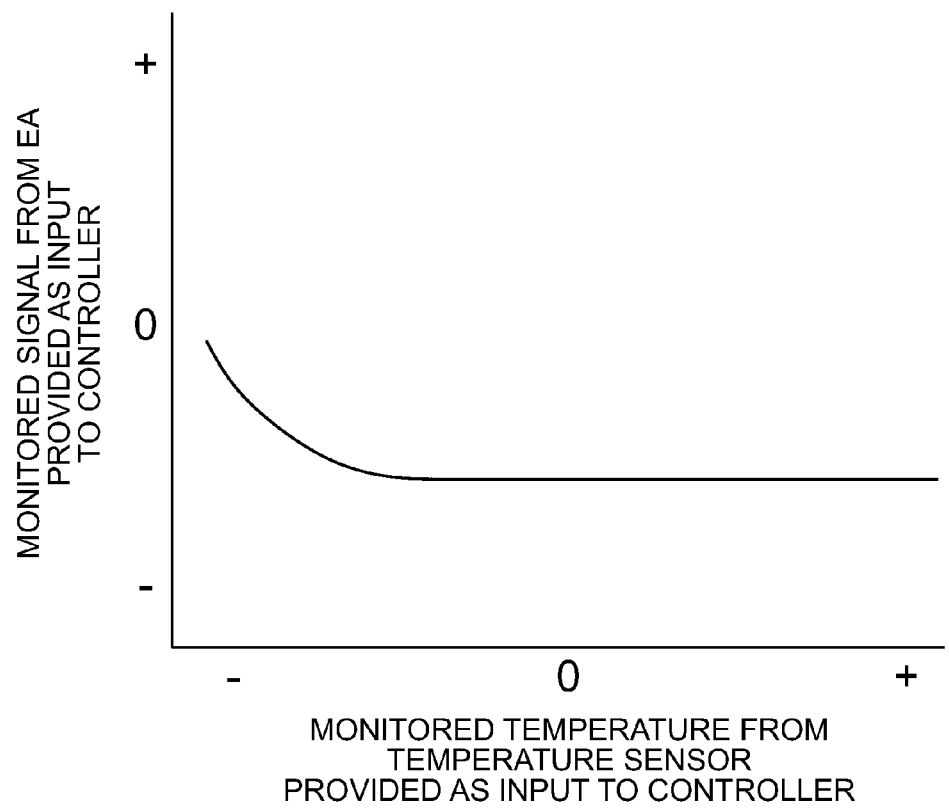
FIG. 8b is a graph showing the relationship between a monitored temperature and the monitored signal from each electric actuator for a given actuator load in the system and method according to the preferred embodiment of the present invention.

The controller 32 is programed or instructed to combine the current sense signal 44 with the temperature signal and calculate the load carried by the actuators 22 and 23. As illustrated in FIG. 8a, the monitored signal from the actuators 22 and 23 (in this case, the current sense signal) is illustrated on the vertical axis and is generally directly proportional to the load illustrated on the horizontal axis carried by the actuators. As the load carried by the actuator increases, the current needed to rotate the electric motor in one direction to extend the actuator or in the other direction to retract the actuator is substantially directly proportional to the load carried by the actuator and is represented by the line on the graph in FIG. 8a. The line shown on the graph illustrated in FIG. 8a is dependent upon mechanical efficiencies and pressure losses and other factors and is determined empirically for any given electric actuator. These will be generally straight lines indicating a generally directly proportional relationship between sensed current and load, within ranges that are sufficient to approximate the load carried by each actuator 22 and 23 for purposes of the method 12 according to the present invention. Thus, the line on the graph of FIG. 8 may be considered an approximation or a center line within data points determined empirically as described above. The line on FIG. 8a is also dependent upon the ambient temperature and rotation direction, and electric actuators 22 and 23 will have a different line on the graph for each operating temperature or temperature range and for each rotation direction. As the temperature of the actuator decreases, the current needed to rotate the electric rotor an one direction to extend the actuator or in the other direction to retract the actuator for a given load increases and is represented by the line on the graph in FIG. 8b. The line shown on the graph illustrated in FIG. 8b is dependent upon mechanical efficiencies and pressure losses and other factors and is also determined empirically for any given electric actuator. This will be a generally straight line at higher temperatures and will be a generally curved line at lower temperatures, indicating the relationship between sensed current and temperature for a given load, within ranges that are sufficient to approximate the load carried by each actuator 22 and 23 for a sensed current and a sensed temperature for purposes of the method 12 according to the present invention. Thus, the line on the graph of FIG. 8 may be considered an approximation or a center line within data points determined empirically as described above.

These graphs are programmed into the controller 32, and the controller is instructed to combine the temperature input and the rotational direction of the electric motor of the electric actuator and the sensed current to select the appropriate line of the graph and determine the load carried by the electric actuator as part of the method described below. Further, at the end of the stroke of the electric actuator in the extending and retracting directions, the sensed electrical current will be at a high level above the levels indicated on the graphs so that the current sense also indicates when the actuator is at the end of its stroke. The associated controller 32 receives the signal indicating the end of the stroke, to tell the controller 32 to stop current flow to the actuator when that condition is reached.

The lines illustrated on FIGS. 8a and 8b will generally indicate the load carried by each actuator 22 and 23 as described above, but only during substantially steady state operating conditions. At the start of flow of electrical current to each electric actuator to start extension or retraction of the actuator, there will be a greater in rush current that is not along the lines illustrated in FIGS. 8a and 8b. Similarly, at the end of flow of electrical current to each electric actuator as extension or retraction is approaching termination when the desired load condition is reached, there will be a back emf (electromagnetic field) created that will also not be along the lines indicated in FIGS. 8a and 8b. If the current sense described above is considered by the controller 32 according to the instructions described above during in rush or back emf conditions, the load determined by the controller 32 will not be accurate and may provide a false load indication or a false direction (extension or retraction) indication. To prevent this, the controller 32 is instructed or programmed to ignore the current sense input from the H bridge driver 41 during an initial time period of current flow at the start of extension and retraction and during a final time period of current flow at the end of extension and retraction. In the preferred embodiment, the current sense input from the actuator 22 or 23 is ignored by the controller 32 during the initial less than about one second and preferably about ¼ second and during the final less than about one second and preferably about ¼ second of current flow for each extension and retraction.

The preferred embodiment of the invention also minimizes erratic or jerky movement during starting and stopping by providing a soft start and a soft stop at the beginning and at the end of each extension and retraction of each actuator. This is achieved by programming the controllers 32, 33 and 37 to provide the PWM signal to spin the electric motor of each actuator at a slower (soft start and soft stop) speed during about ¼ seconds at the start and prior to the stop for each extension and each retraction. The transition from zero revolutions per minute to the slower speed and from the slower speed to an operating speed (and back to the slow speed and to zero) is preferable done in multiple step speed increase and decrease increments during the ¼ second transition, to facilitate smooth operation of the system 11 and method 12. In this manner, the PWM signal causes each actuator to move at one velocity during a first displacement or movement and at another velocity during a second displacement or movement. For soft start, the first displacement is an initial displacement at start and the velocity during the initial displacement is substantially less than the velocity during the second or further displacement. For soft stop, the velocity during the second displacement is substantially less than the velocity during first displacement. This soft start and soft stop capability can also be utilized to control or change velocity of each actuator during any number of other time periods or displacements or displacement increments of each actuator. This velocity control allows the speed of each actuator to be varied to meet any number of desired speeds for different operating objectives.

Figure 4:
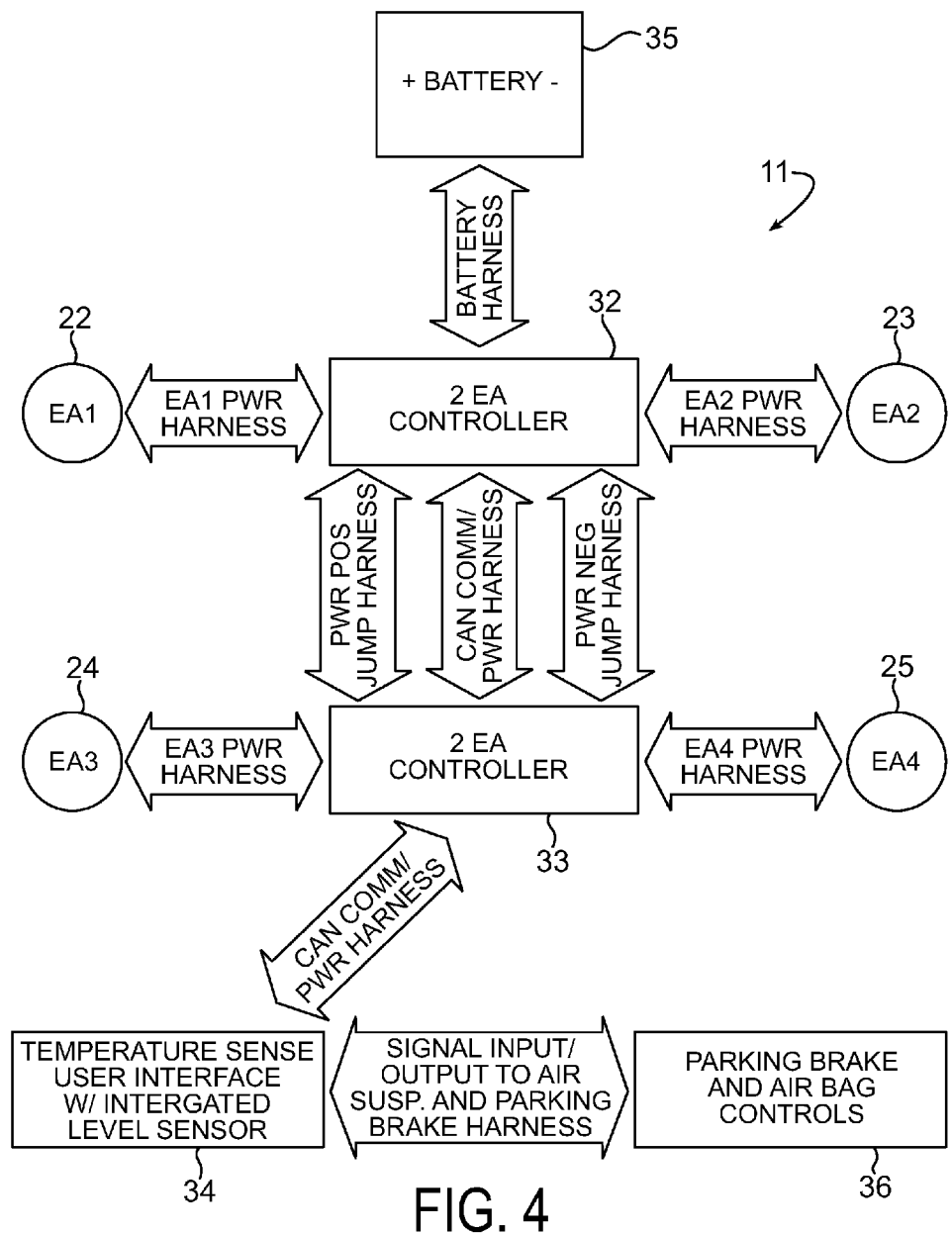
FIG. 4 illustrates a system and method according to the preferred embodiment of the present invention, using four electric actuators.
Figure 9:
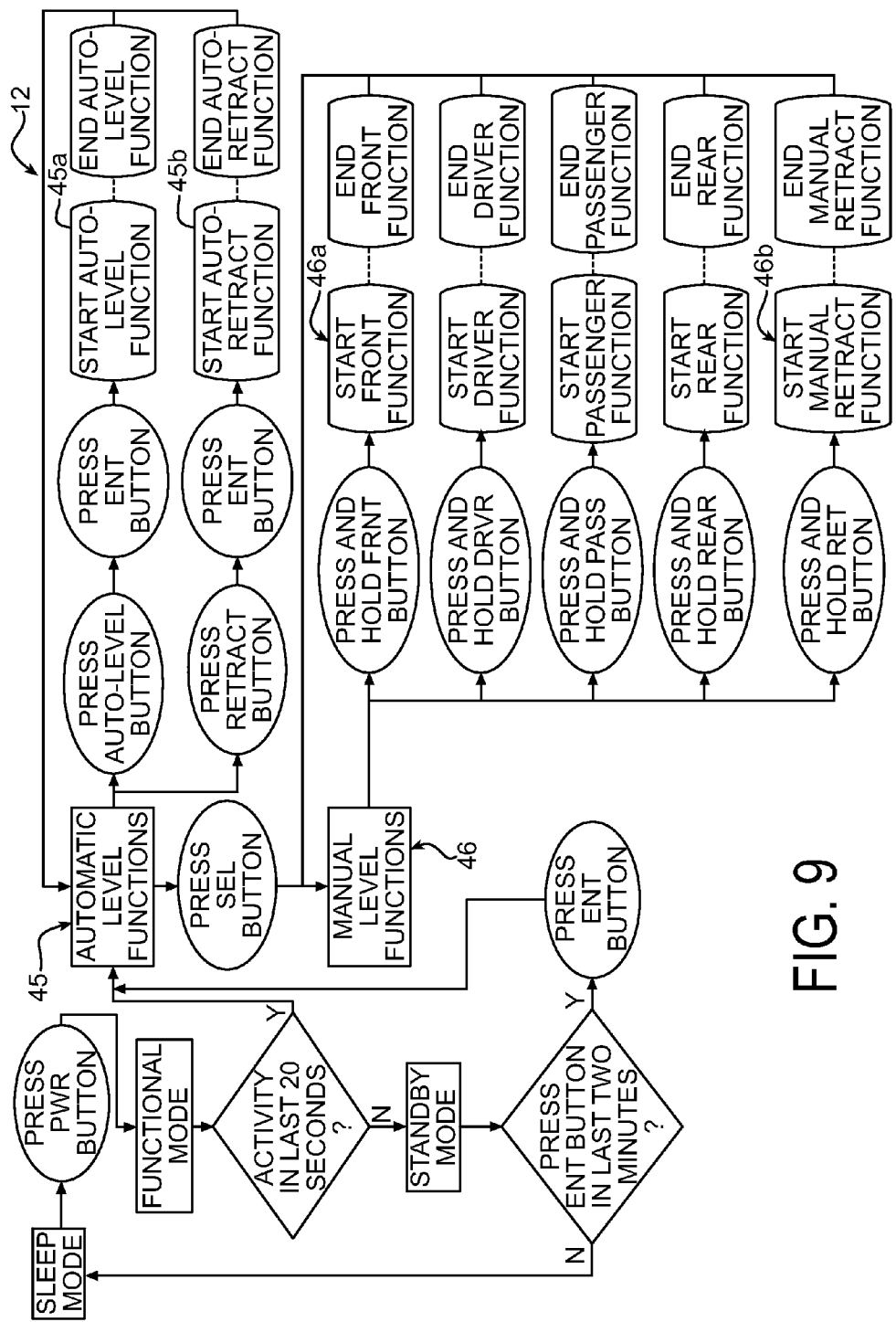
FIG. 9 is a flow chart showing the method and system according to the preferred embodiment of the present invention.

Referring now to FIGS. 9-13, the method 12 according to the present invention used with the four actuator system of FIG. 4 is illustrated. The method 12 is also used with the six actuator system of FIG. 5, with the two actuator system of FIG. 6, and with any other desired number of controllers and actuators, by adding or subtracting the appropriate steps described below. Circles on FIGS. 9-13 represent user input, rectangles with single sides represent mode or function, rectangles with double sides represent automatic process, hexagons represent time delay, rhombi represent decision or yes/no, and boxes with two straight and two curved sides represent a jump in the flow chart to a more detailed flow chart. As shown in FIG. 9, when the vehicle 10 is parked and is to be leveled, the method 12 begins by the operator activating a power (PWR) button. For an automatic leveling and automatic retract portion of the method 12 described further below, the operator then activates an auto-level button or retract button and an enter button. For a manual leveling and manual retract portion of the method 12 described further below, the operator instead operates the manual (front, driver side, passenger side, or rear) button and then the level or retract button. By providing both automatic operation 45 and manual operation 46 in a single system 11 and method 12, operating choices for the operator are increased for selection based upon terrain and operator preferences. For example, at very low operating temperatures indicated on the FIG. 8b graph to the left of the line, the method 12 could preclude automatic leveling or retraction and require manual leveling or retraction. Additional options for operator input and for additional functions (not shown) can optionally be provided.

Figure 10B:
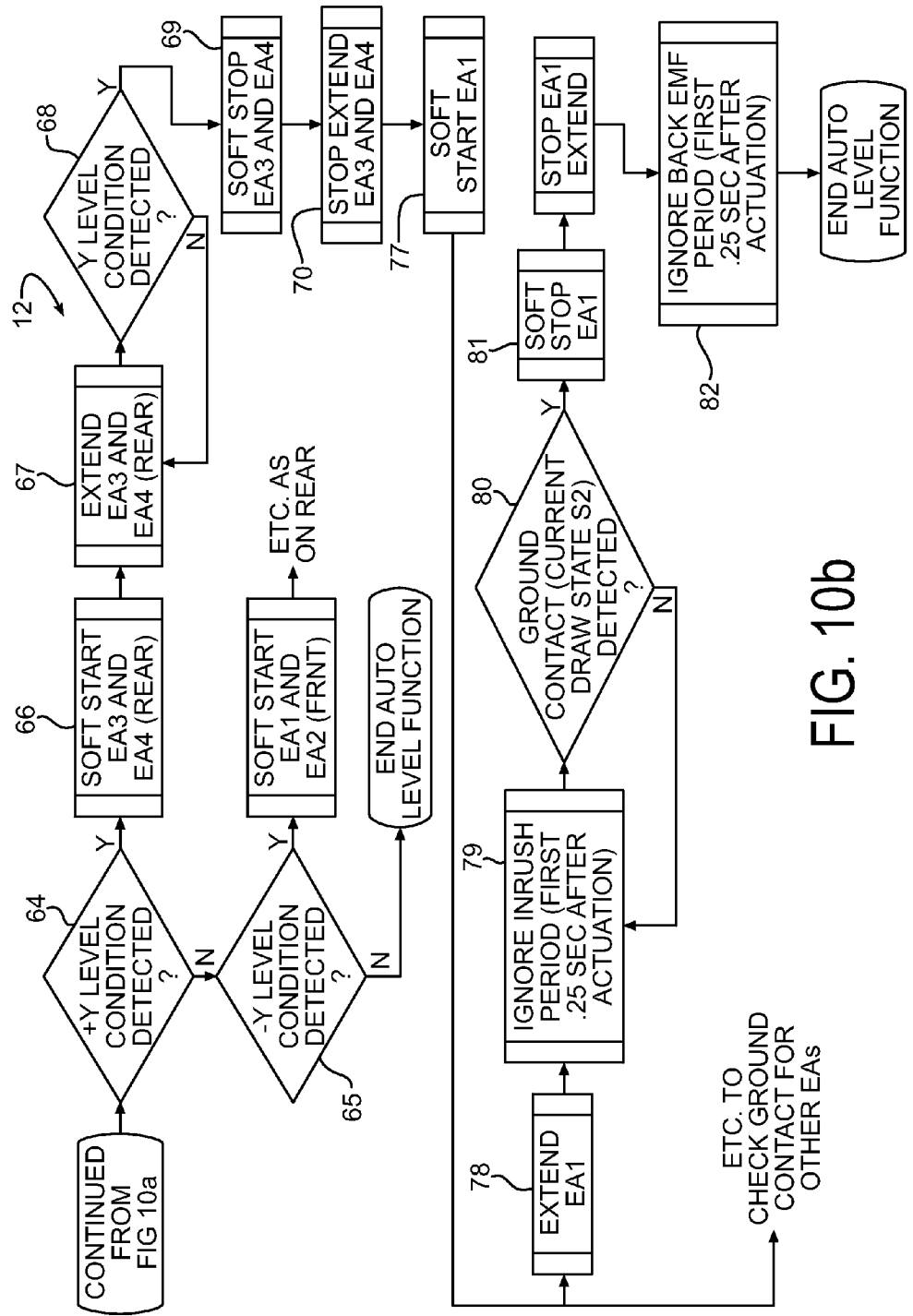

The automatic leveling portion 45 of the method 12 indicated by the jump boxes of FIG. 9 is illustrated in FIGS. 10a and 10b. The automatic leveling by the method 12 occurs simultaneously for all of the electric actuators of the system 11. The automatic leveling extends all of the actuators until ground contact is sensed at all actuators, and the actuators wait until such ground contact is sensed at all actuators before loaded movement of the actuators occurs. The automatic leveling by the method 12 will be explained with reference to one of the electric actuators (actuator 22), while it is to be understood that the same method occurs in this manner at the same time for each of the other actuators. For the electric actuator 22, the controller 32 begins the above described soft start and begins extending the actuator 22 with an initial electrical current provided to the actuator 22. The temperature sense 34 communicates the ambient temperature to the controller 32. The H bridge driver 41 begins to measure the current supplied to the actuator 22 at 46, and the controller 32 begins to soft start the actuator at 47 and provides an initial current to the actuator at 48 to begin to extend the actuator 22. The controller 32 at the beginning of the initial current 48 ignores this current signal at 49 during the first ¼ second as described above. After this ¼ second, the controller 32 continues to control the initial electrical current to the actuator 22 and determines the graph line (FIGS. 8a and 8b) for the extension direction of rotation of the actuator 22 and for the signaled ambient temperature. In each instance in FIGS. 9-12 in which measuring current draw is indicated, the measuring current draw includes sensing current draw and communicating the sensed current draw to the controller and combining the sensed current draw with the sensed temperature to determine load (after in rush and back emf time periods). When the controller 32 indicates by the magnitude of the current sense signal reaching S2 that the actuator 22 has contacted the ground 26 with sufficient force at 50 as described above to carry a substantial load and avoid an unstable level condition, the controller 32 commands a soft stop 51 for the actuator 32 and ignores the current sense signal at 52 during the last ¼ second as described above. This is repeated simultaneously for each of the actuators 22-25 by their respective controllers 32 and 33 (not illustrated in FIG. 10a), until the controllers 32 and 33 determine at 53 that all of the actuators 22-25 are carrying the above described substantial load to avoid leveling the vehicle 10 when the wheels 18-21 are still carrying too much of the load of the vehicle 10.

The controller 32 next receives an input signal from the level sensor to indicate if a +X or a −X condition described above is present at 54 and 55. If a +X condition is detected, the controllers 32 and 33 command another soft start at 56 for the actuators 23 and 25 on the passenger side to begin leveling the vehicle 10 by providing a further electrical current at 57 to extend the actuators 23 and 25. If an X level condition is not detected at 58, the controllers 32 and 33 move in a loop indicated in FIG. 10 until the X level condition is detected. The controllers then begin to terminate the further flow of electrical current at 57 to the actuators 23 and 25 and soft stop the actuators at 59 to stop extension at 60. Since the system 11 and method 12 during this further current draw and further actuator extension already knows that the actuators 23 and 25 are carrying a sufficient load, it is not necessary during these steps to sense and consider the loads (except to detect a sufficient load to signal an end of stroke condition). When the X level condition is achieved, the method 11 performs similar steps for +Y and −Y at 64-70 and repeats these steps simultaneously for the other actuators (and their respective controllers) until no condition of +X, −X, +Y, or −Y is detected. If an X level condition is present at the beginning of the method, the method will skip to the described Y leveling method. Thus, during the initial extension of the actuators until ground contact all four of the actuators extend simultaneously. During the subsequent leveling extension, sets of two of the actuators operate simultaneously to achieve the X level and Y level condition. To achieve the Y level condition, the sets of two actuators will be actuators 22 and 23 (associated with controller 32) or actuators 24 and 25 (associated with controller 34). To achieve the X level condition, the sets of two actuators will be actuators 22 and 24 (associated with controllers 32 and 33) or actuators 23 and 25 (also associated with controllers 32 and 33). At this point in the method, the vehicle 10 is level. The method 12 then verifies and confirms that all of the actuators 22-25 are still sufficiently loaded at 77-82, in case the extension of some actuators during leveling has caused another actuator to have a reduced load or to disengage from ground 26. During this final check of ground contact, only the two actuators that did not move most recently are checked for ground contact. If during this method 12 the controllers 32 and 33 detect that any of the actuators 22-25 are at the end of their strokes, the initial or further current flow to the fully extended actuator is terminated and leveling is accomplished either through extension of the other actuators of the system, or, if that is not possible, by the user moving the vehicle or placing blocks under actuators. At this point in the method, the vehicle 10 is level and the controllers 32 and 33 terminate further extension of the actuators 22-25 until a further user input command is received.

This described automatic leveling portion of the method 12 is also used for the six actuator system illustrated in FIG. 5 or for the two actuator system illustrated in FIG. 6. When the system is used with the six actuator system illustrated in FIG. 5, the six actuator system may be used on a type of vehicle commonly called a fifth wheel trailer in which the trailer has four wheels and a front hitch of the trailer is fastened to hitch on a truck bed generally located about above the rear wheels of the truck. In this application, the two forward actuators closest to the hitch are first extended to lift the front of the trailer off of the hitch on the truck bed. Then, when the leveling function is started, these two front actuators either extend or retract to achieve a Y level condition. As this Y leveling occurs, the other four actuators extend to make ground contact with minimum load as described above in connection with the four actuator system of FIG. 4. Once the Y level condition is achieved, all six actuators are in ground contact with the minimum load. Then, the vehicle is leveled in the X direction according to the method described above in connection with the four actuator system, except that the three actuators on each side of the vehicle operate as a set to achieve the X level condition. When the X level condition is achieved, the actuators not most recently extended are fired or actuated to confirm ground contact with minimum load as described above in connection with the four actuator system. Further, this automatic leveling may also be used for the additional actuator systems illustrated in FIGS. 14-16 described below.

Figure 11:
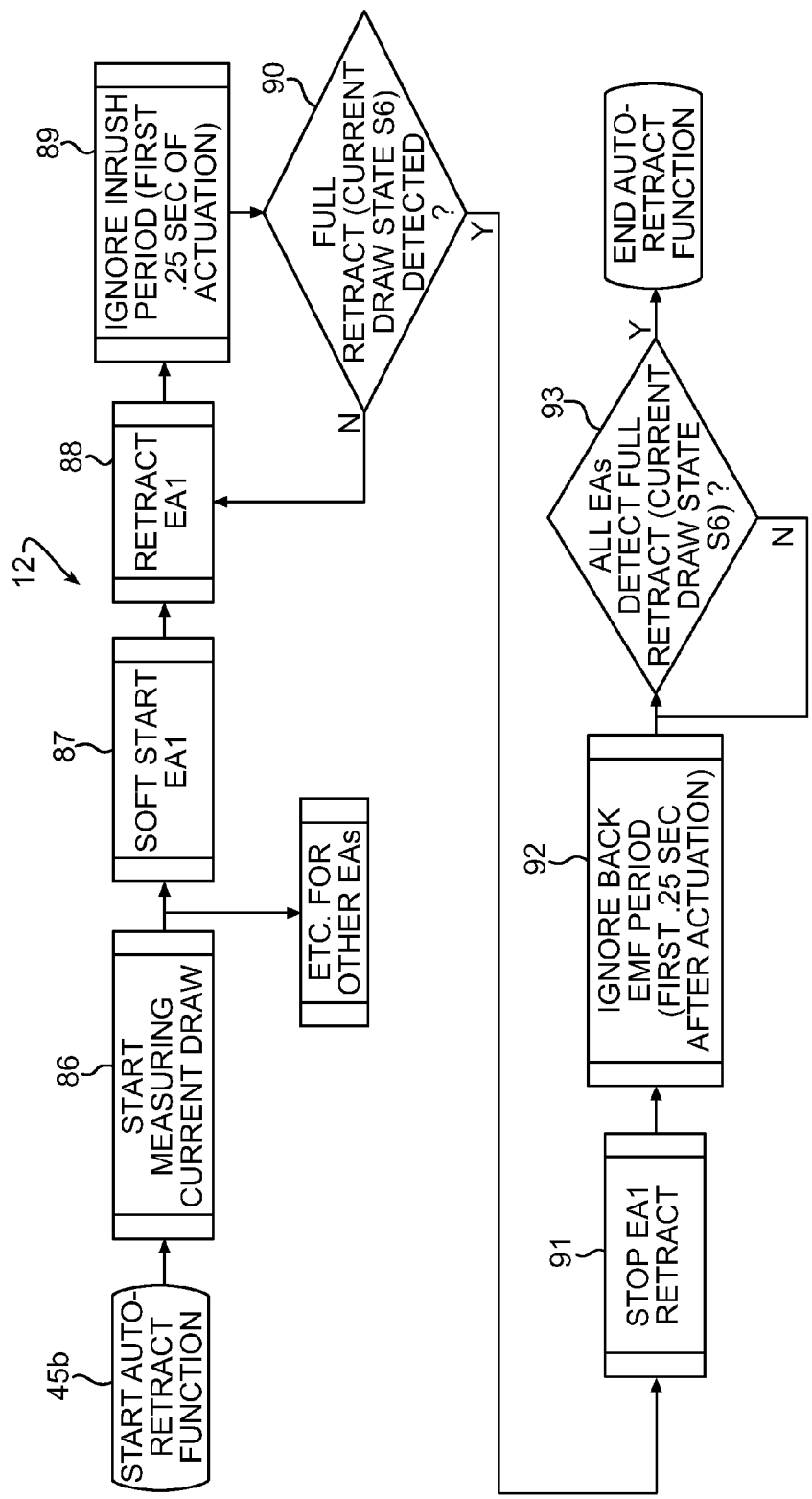
FIG. 11 is a flow chart showing an automatic retract portion of the flow chart illustrated in FIG. 9.

The automatic retract portion 45b of the method 12 indicated by the jump boxes of FIG. 9 is illustrated in FIG. 11 by steps 86-93. Soft start, soft stop, temperature sense, current sense, ignore inrush period, ignore back emf period steps of the method 12 to accomplish automatic retract are the same as during automatic leveling, except as indicated in FIG. 11 or described below. The illustrated automatic retract by the method 12 occurs simultaneously for all of the electric actuators of the system 11. When the controllers 32 and 33 sense that the actuators 22-25 are fully retracted, the controllers 32 and 33 terminate further retract signals to the actuators until a further user input command is received.

This described automatic retract portion 45b of the method 12 is also used for the six actuator system illustrated in FIG. 5 (except that the front two actuators 38 and 39 remain stationary while the other four actuators 22-25 retract; then the truck is positioned under the hitch of the trailer; then a second retract function is activated which retracts the two front actuators 38 and 39 to place the hitch of the trailer on the truck hitch) or for the two actuator system illustrated in FIG. 6. Further, this automatic retract may also be used for the additional actuator systems illustrated in FIGS. 14-16 described below.

Figure 12:
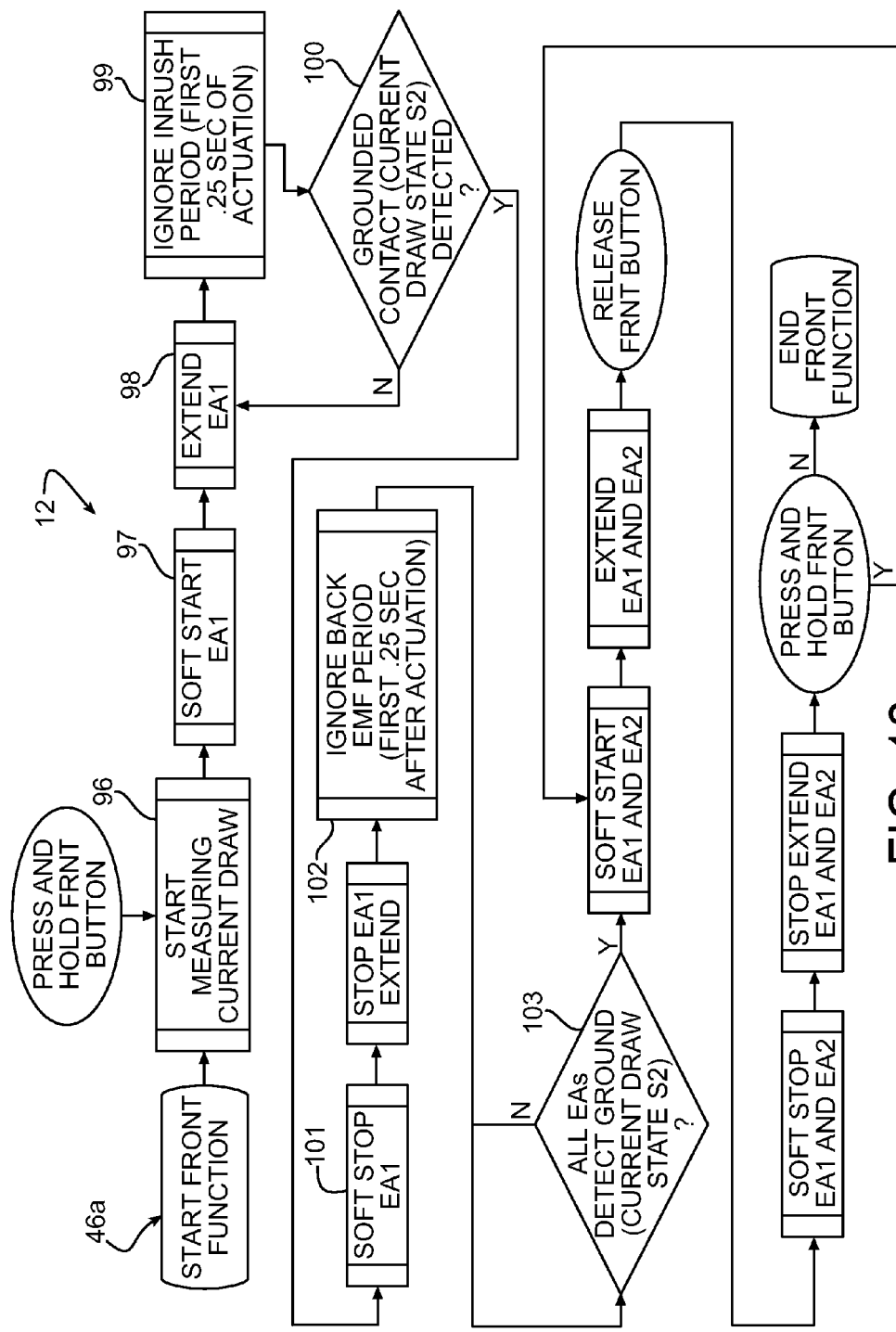
FIG. 12 is a flow chart showing a manual leveling portion of the flow chart illustrated in FIG. 9.
Figure 13:
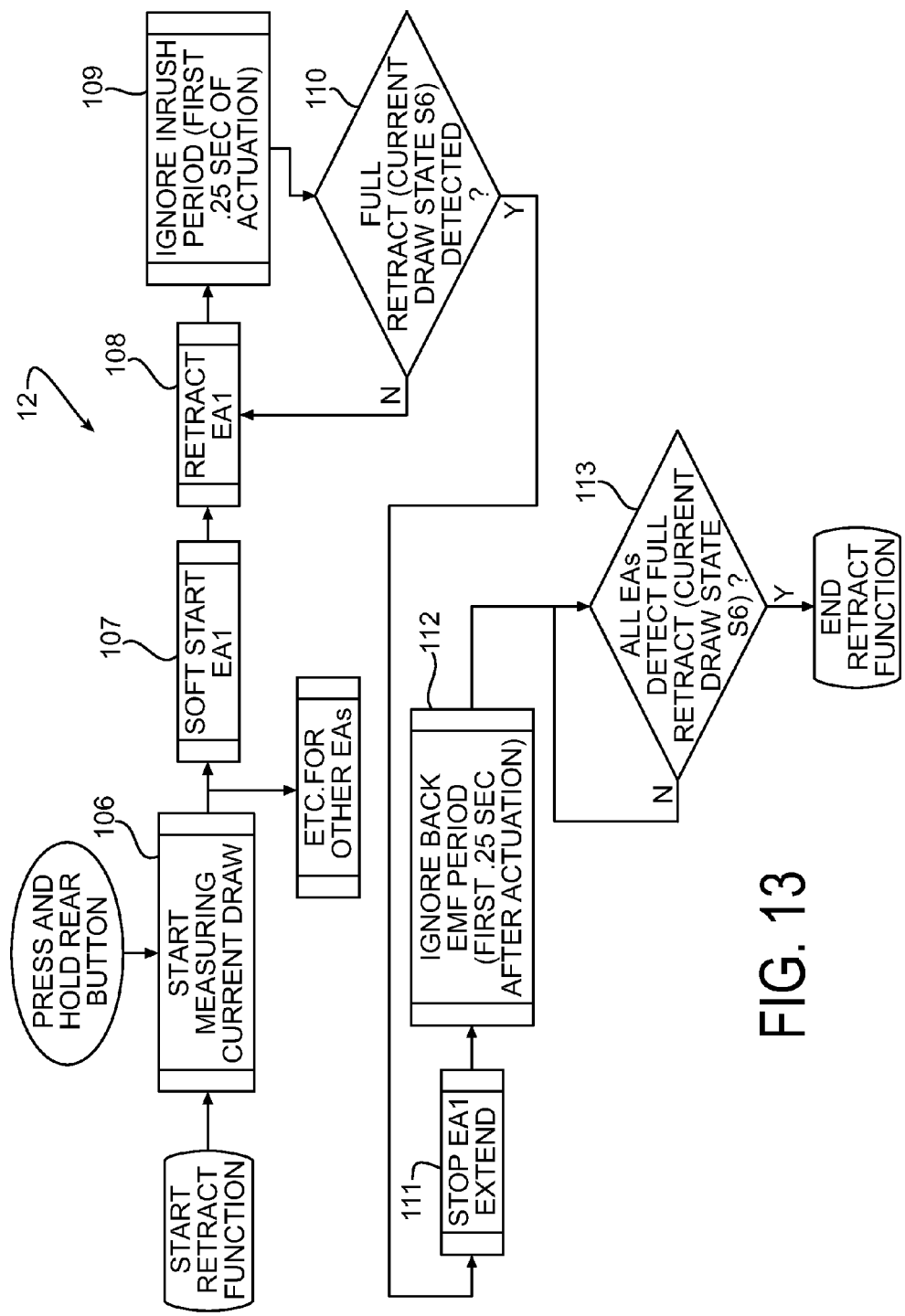
FIG. 13 is a flow chart showing a manual retract portion of the flow chart illustrated in FIG. 9.

The manual leveling portion 46a and manual retract portion 46b of the method 12 indicated by the jump boxes 46 of FIG. 9 are illustrated in FIGS. 12 and 13. The manual leveling 46a includes steps 96-103, and the manual retract portions 46b of the method 12 includes steps 106-113, all of which are the same or similar to the automatic leveling 45a and automatic retract 45b steps described above, except as illustrated in FIGS. 12 and 13 and described below. For manual leveling, two actuators work together and are dependent upon each other for proper function, with either one of the two actuators typically hitting the ground first and waiting for the other actuator to hit the ground before loaded movement occurs. For manual leveling with the four actuator system as illustrated in FIG. 12, the operator presses the front button, causing the controller 32 to operate the actuators 22 and 23 to engage the ground 26 with sufficient load as described above and to then operate the actuators 22 and 23 to achieve a front level condition satisfactory to the user. The level sensor may provide a visual indicator to the user, such as by indicator lights, when level or not level conditions in the X and Y directions are present. Similarly, the operator may then press a driver button (not shown), causing the controller 33 to operate the actuators 22 and 25 to engage the ground 26 and to then operate the actuators 22 and 25 to achieve a driver level condition satisfactory to the user. If desired, the operator can press a passenger button (not shown) to perform the same method to operate actuators 23 and 25 or a rear button (not shown) to perform the same method to operate actuators 24 and 25. For the manual retract function illustrated in FIG. 13, the operator presses a manual retract button to cause the controllers 32 and 33 to retract the actuators 22-25 until each is in a fully retracted position. In the case of manual leveling with a six actuator system, as mentioned above, the front two actuators are first extended to lift the trailer hitch off of the truck hitch. Also, for manual X leveling with a six actuator system, three actuators on each side of the trailer work together. For manual retract with a six actuator system, the trailer hitch is lowered onto the truck bed hitch using the forward two actuators after the other four actuators are retracted.

Figure 14:
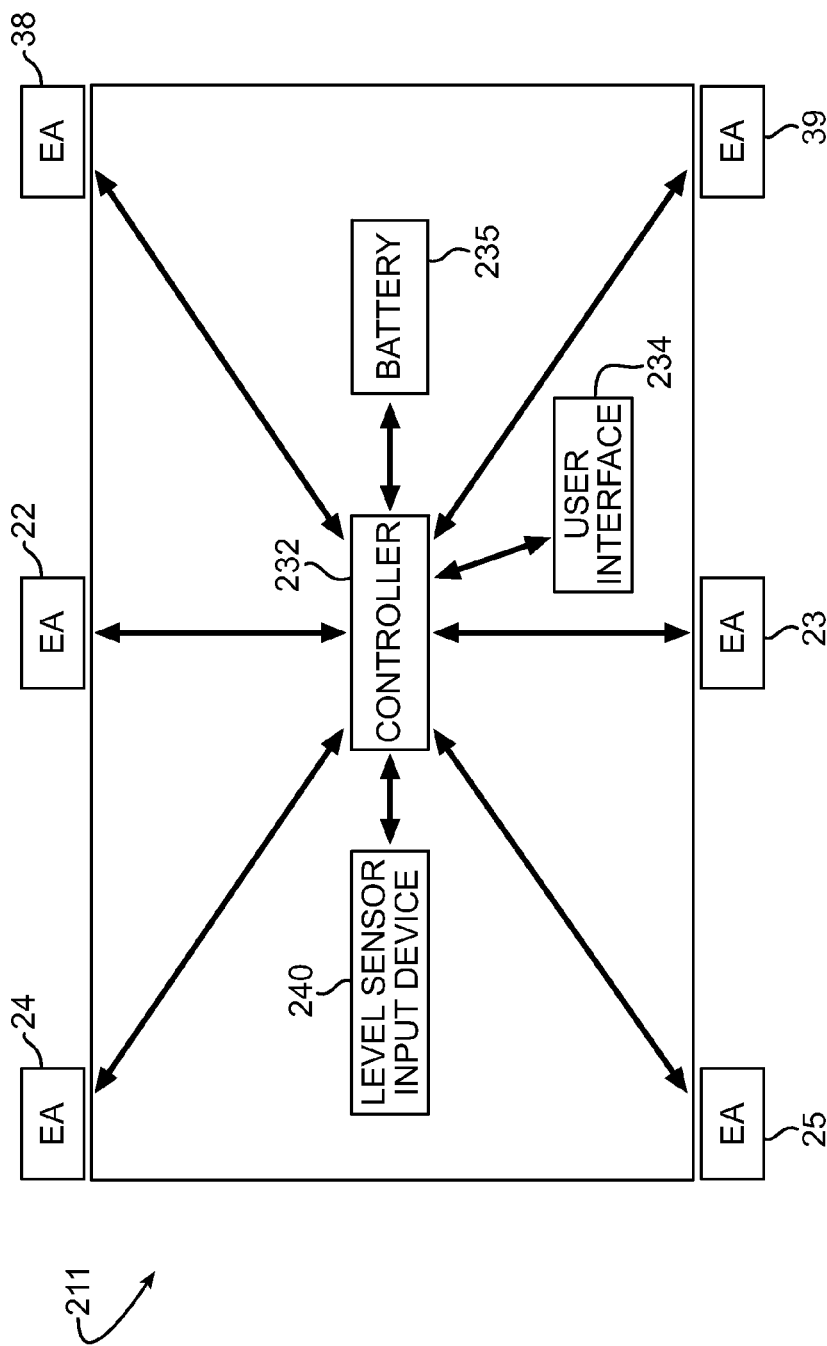
FIG. 14 illustrates a system and method according to an alternate embodiment of the present invention, using four electric actuators.
Figure 15:
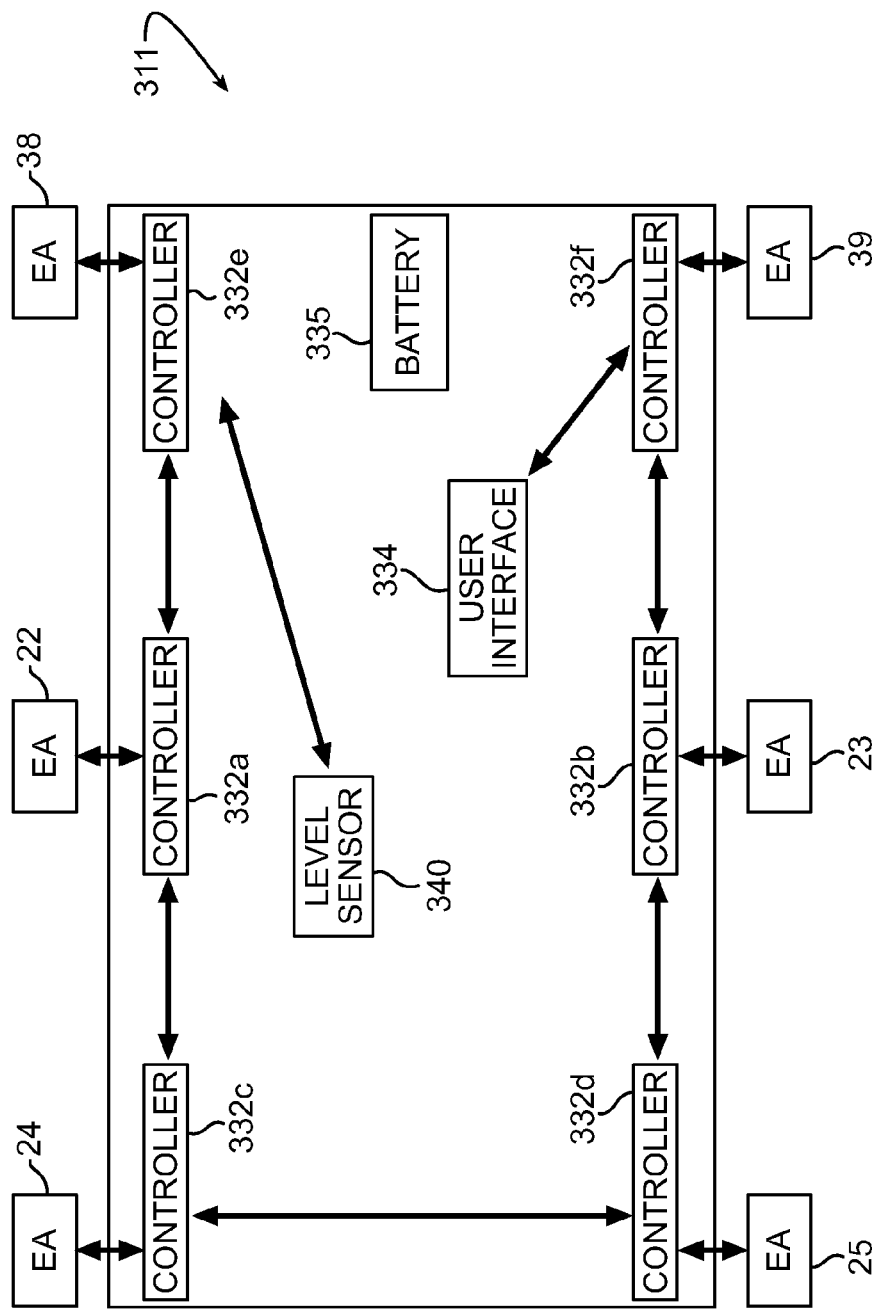
FIG. 15 illustrates a system and method according to an alternate embodiment of the present invention, using four electric actuators.
Figure 16:
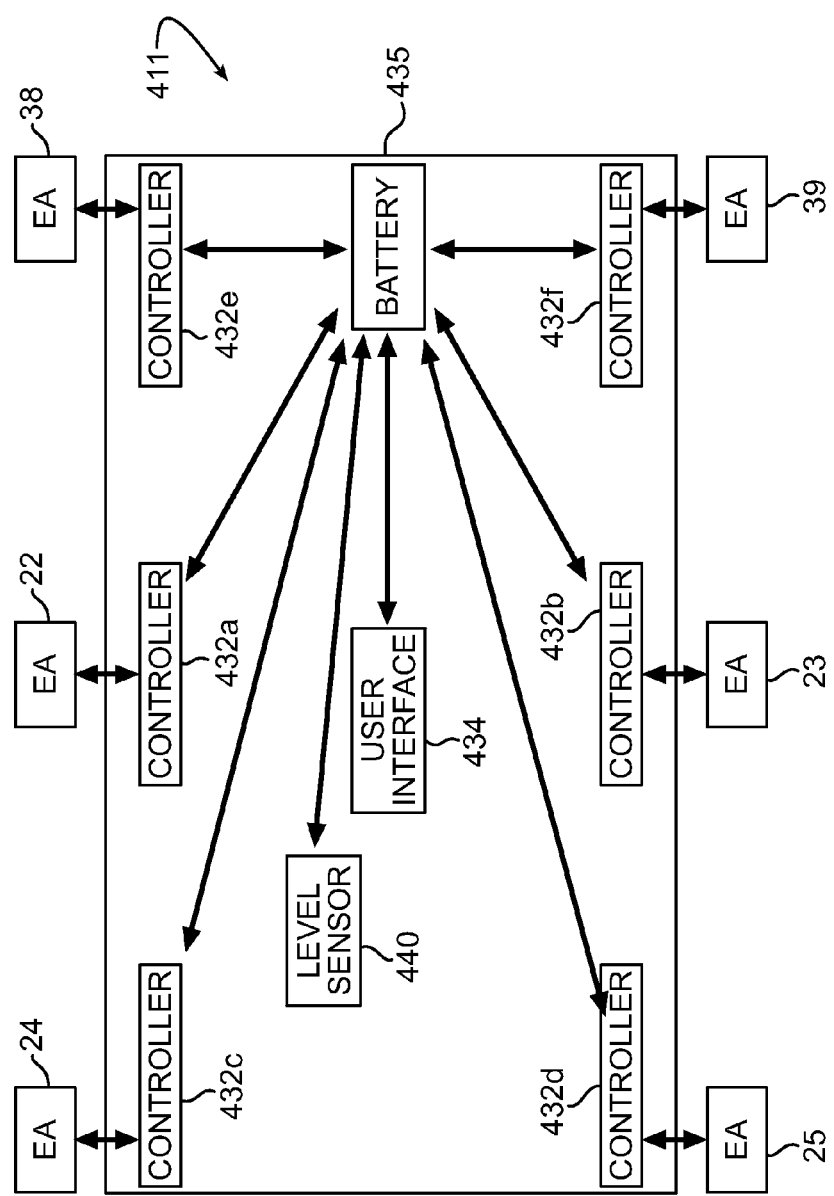
FIG. 16 illustrate system and method according to an alternate embodiment of the present invention, using four electric actuators.
Figure 17:
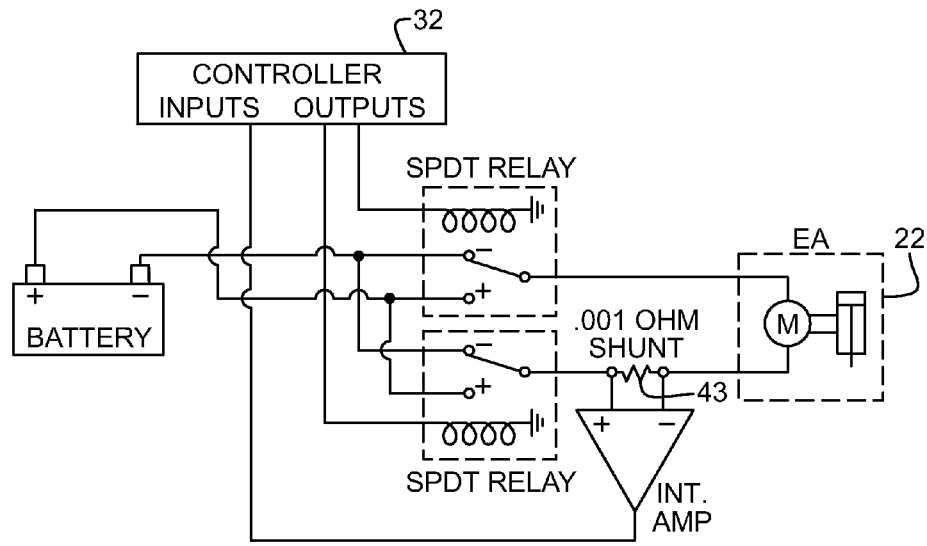
FIG. 17 is a current sensing schematic for the method and system according to an alternate embodiment of the present invention.
Figure 18:
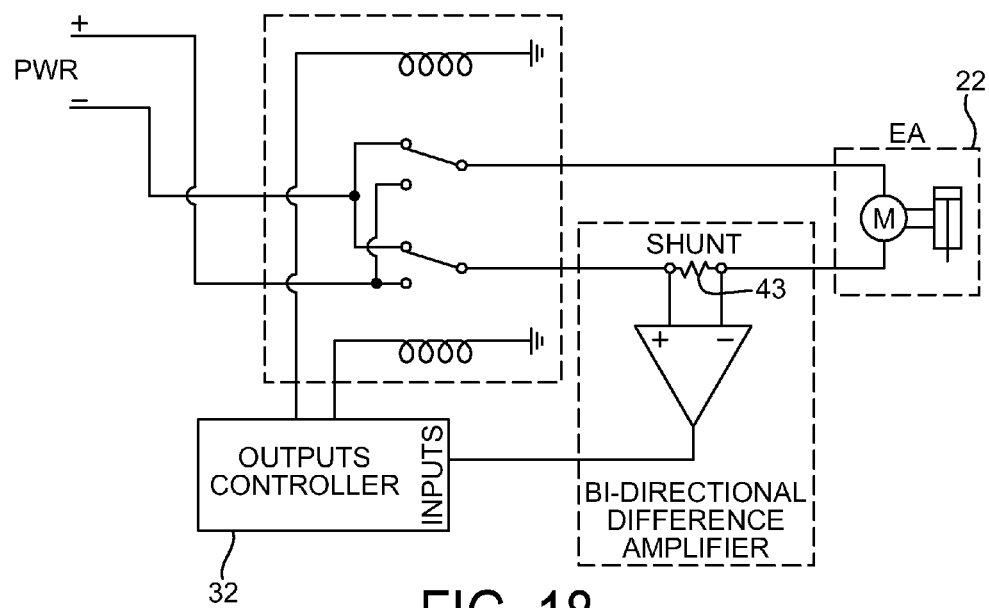
FIG. 18 is a current sensing schematic for the method and system according to another alternate embodiment of the present invention.
Figure 19:
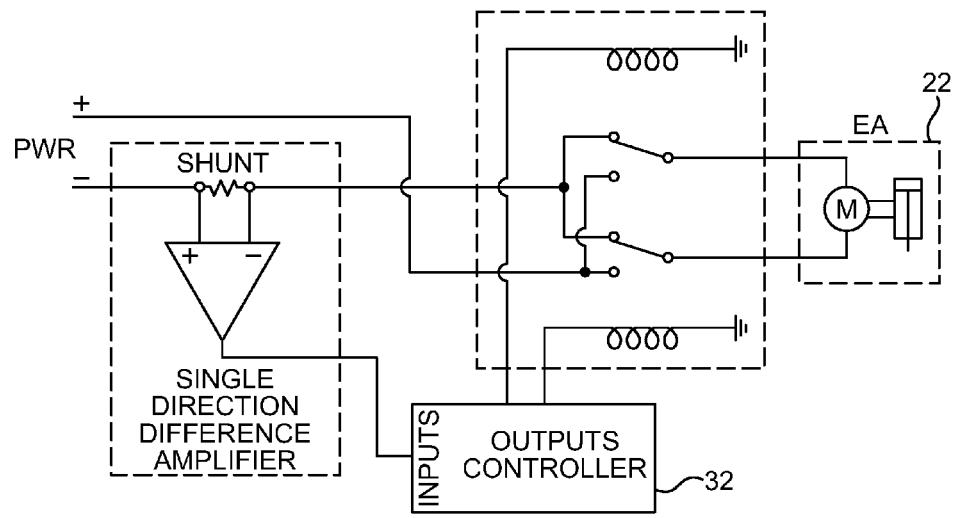
FIG. 19 is a current sensing schematic for the method and system according to another alternate embodiment of the present invention.
Figure 20:
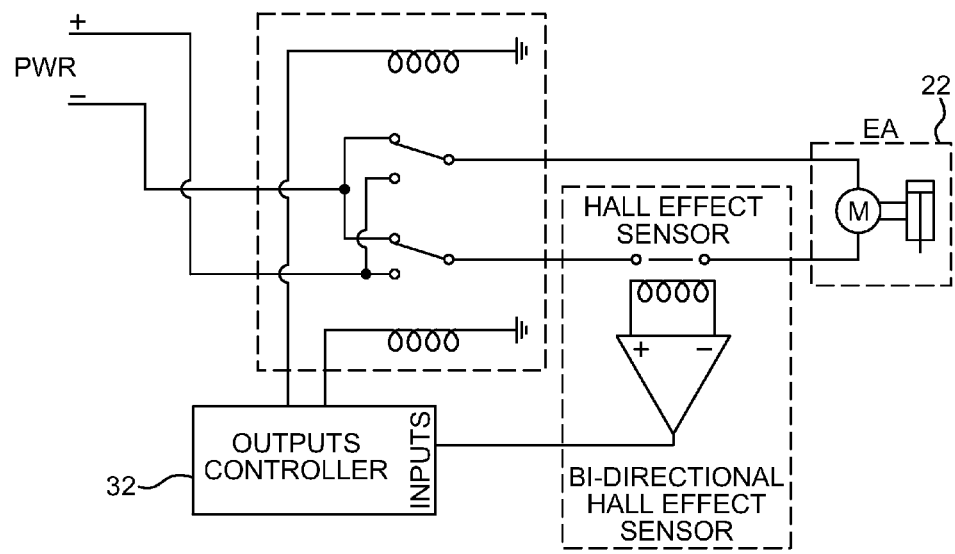
FIG. 20 is a current sensing schematic for the method and system according to another alternate embodiment of the present invention.
Figure 21:
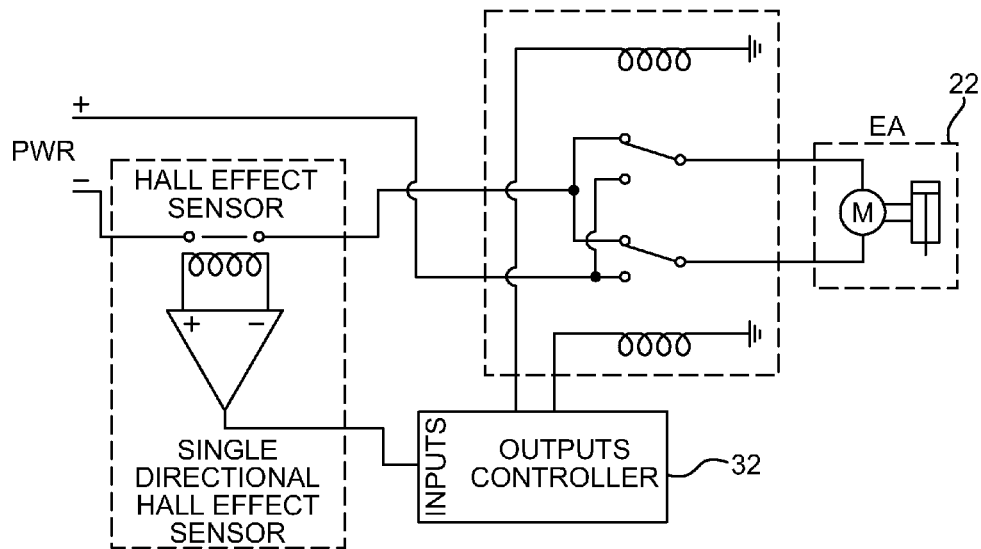
FIG. 21 is a current sensing schematic for the method and system according to another alternate embodiment of the present invention.

Turning now to FIGS. 14-16, alternate system configurations 211, 311 and 411 are illustrated for use with the six electric actuators 22, 23, 24, 25, 38 and 39.

In the alternate system 211 illustrated in FIG. 14, the controller 232 is a central controller. The controller 232 receives load signal inputs from each of the actuators 22-15, 38 and 39 of the system using the current sense of FIG. 7, receives power from a battery 235, receives a temperature signal and user commands from user interface 234, and receives a level attitude signal from a level sensor 240. The controller 232 controls each of the actuators 22-25, 38 and 39 to execute the method 12 substantially as described above and illustrated in FIGS. 9-13.

In the alternate systems 311 and 411 illustrated in FIGS. 15 and 16, controllers 332a-332f and 432a-432f are distributed controllers. The distributed controllers are each connected with a single one of the actuators 22-25, 38 and 39. The distributed controllers 332a-332f and 432a-432f each receive load signal inputs from its associated actuator using the current sense of FIG. 7, receive power from a battery 335, 435, receive a temperature signal and user commands from user interface 334, 434, and receive a level attitude signal from a level sensor 340, 440. The distributed controllers 332a-332f and 432a-432f control the actuators 22-25, 38 and 39 to execute the method 12 substantially as described above and illustrated in FIGS. 9-13. Use of the distributed controllers illustrated in FIGS. 15 and 16 may allow system customization and may facilitate installation.

Turning now to FIGS. 17-21, alternate current sense subsystems are illustrated. The alternate current sense subsystems shown in FIGS. 17-21 may be substituted into the systems 11, 111, 211, 311 and method 12 described above in place of the current sense subsystem illustrated in FIG. 7 and described above. Except to the extent the current sense subsystems of FIGS. 17-21 differ from the current sense subsystem illustrated in FIG. 7, a system 11, 211, 311 and 411 and method 12 using the current sense subsystems of FIGS. 17-21 will operate in substantially the same manner as described above. As illustrated in FIGS. 17-21, controller 32 receives as an input a temperature sense signal (through an integrated temperature sense or external temperature sense, as described above) and a current sense load signal that is proportional to the current supplied to the actuator 22. This current sense load signal relates to the load carried by the actuator 22 in the manner illustrated in the graph of FIGS. 8a and 8b and explained above, and the controller combines this load signal with the temperature signal to calculate the load on the actuator 22 in the execution of the system 12.

Figure 22:
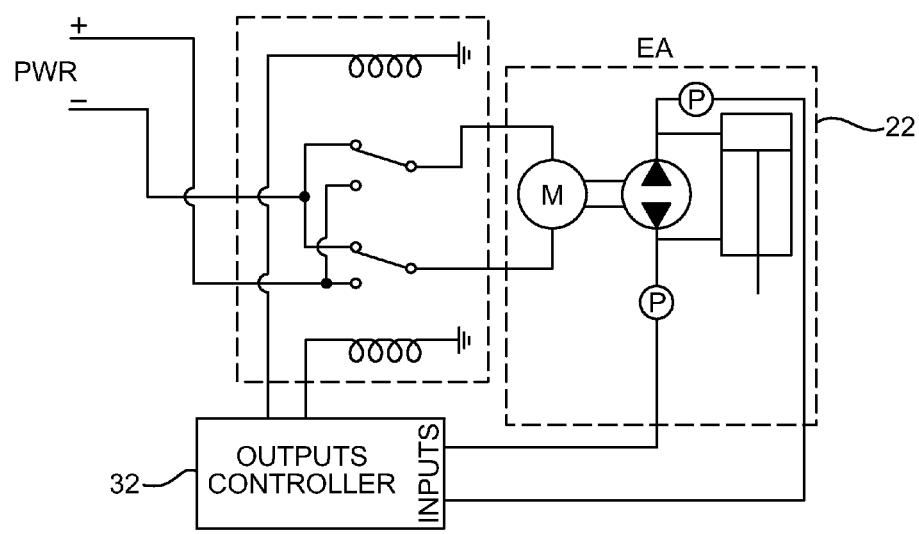
FIG. 22 is an actuator load sensing schematic for the method and system according to another alternate embodiment of the present invention.
Figure 23:
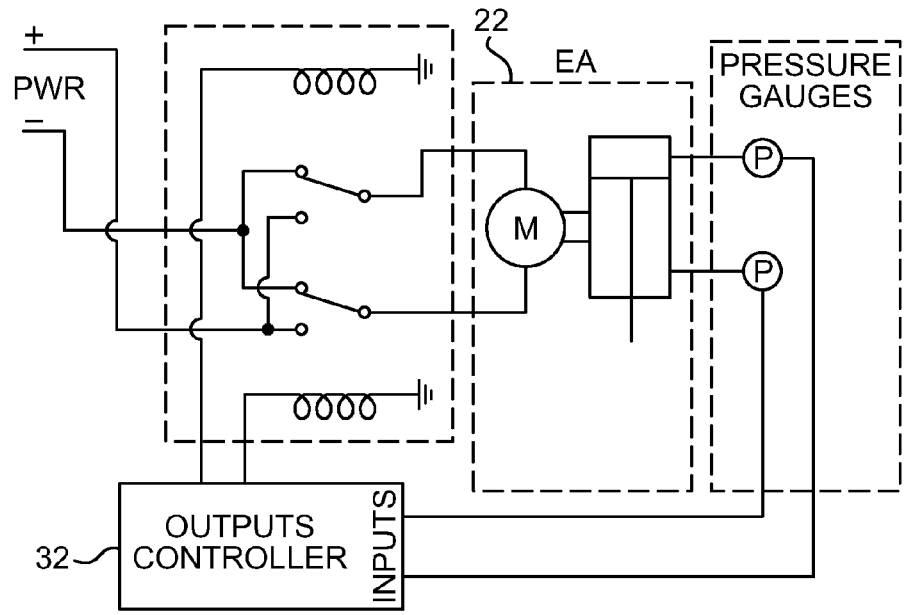
FIG. 23 is an actuator load sensing schematic for the method and system according to another alternate embodiment of the present invention.
Figure 24:
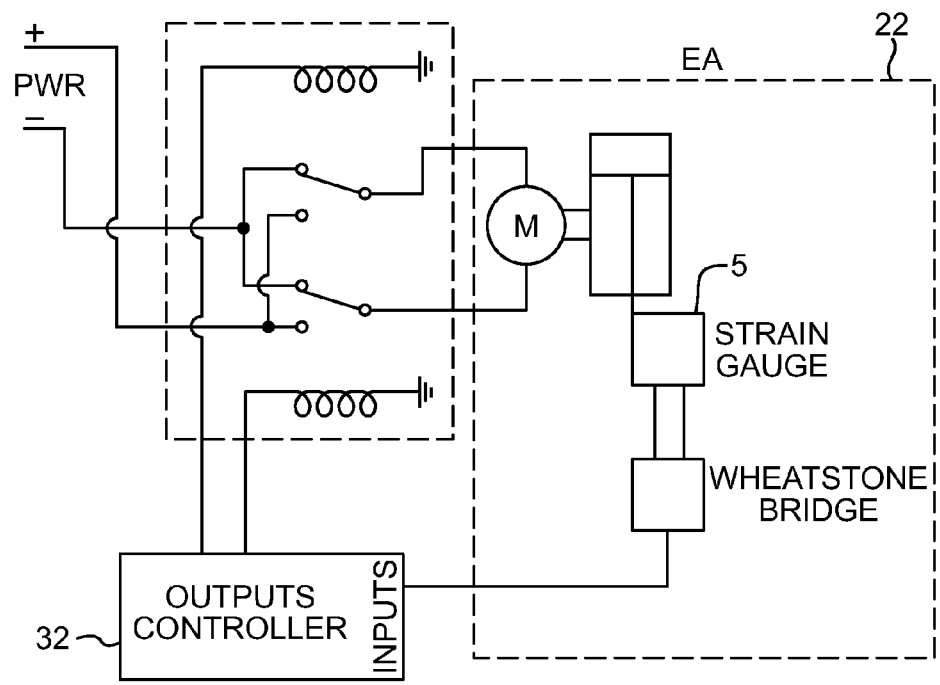
FIG. 24 is an actuator load sensing schematic for the method and system according to another alternate embodiment of the present invention.

Turning now to FIGS. 22-24, alternate load sense subsystems for use in the system 11 are illustrated that sense the load in the actuators 22-25, 38 and 39 using a method other than the current sense subsystem of FIG. 7 or FIGS. 17-21. The load sense subsystems of FIGS. 22-24 may be used in the system 11, 211, 311, 411 and method 12 described above in place of the load sense subsystem illustrated in FIG. 7, and the resulting system and method will operate substantially as described above except to the extent of described differences or as shown in the drawings. In place of the current sense from the FIG. 7 subsystem, the system 11 and method 12 using the described load sense subsystem of FIGS. 22-24 will provide a different load sense signal as an input to the controllers 32, 33, 37. The load sense signal provided by the load sense subsystem of FIGS. 22-24 will also be directly proportional to the load carried by each electric actuator from which the load sense signal is received, but the load sense subsystems illustrated in FIGS. 22-24 may require additional components such as pressure sensors or strain gauges or position sensors and additional system complexity. The proportional relationship between the load sense signal of FIGS. 22-24 and the load carried by each electric actuator will be generally as illustrated in FIG. 8 and will be determined empirically, in a manner substantially as described above in connection with the load sense signal provided by the FIG. 7 current sense arrangement.

As shown in FIGS. 22 and 23, the load sense signal provided by each electric actuator, such as actuator 22, to its associated controller, such as controller 32, to indicate the load carried by the actuator is provided by known pressure transducers P. The actuator 22 in the FIGS. 22 and 23 arrangements is an electro-hydraulic actuator, and pressure transducers P sense the pressure at the outlet of the hydraulic pump of the electro-hydraulic actuator (FIG. 22) or at the high pressure side of the hydraulic cylinder of the electro-hydraulic actuator (FIG. 23) and provide that sensed pressure as an input signal to the associated controller 32. The load carried by the actuator 22 is proportional to this pressure signal provided to the controller 32, and the controller 32 combines the load sense signal with a temperature signal to determine the load based upon the above described FIG. 8 graph. The system 11 and method 12 then operate substantially as described above to level the vehicle 10. In the load sense subsystem illustrated in FIG. 24, a known strain gauge S is used in place of the current sense subsystem of FIG. 7 to determine the strain on the rod of the actuator 22. The strain as determined by the strain gauge S is proportional to the load carried by the actuator 22 and is communicated as an input to the controller 32. The system 11 and method 12 then operate substantially as described above to level the vehicle 10, except that a temperature input to the controller 32 may not be required. In another alternate load sense subsystem, not illustrated in the drawings, a known position sensor is used in place of the current sense subsystem of FIG. 7 to determine the position or amount of extension of the actuator 22 from its fully retracted position. The position sensor may be, for example, a variable differential transformer (LVDT), a reed switch sensor or a contact switch. Because the weight of the frame and body 13 of the vehicle 10 and the characteristics of the springs and suspension components of the vehicle 10 are known, the load carried by the actuator 22 will be proportional to the position of the rod of the actuator 22 so that the position signal will provide an input to the controller 32 to indicate the load carried by the actuator 22. Also, if a contact switch is used, the contact switch may indicate contact with the ground 26 such that further extension of the actuator 22 after such contact will provide substantial loading of the actuator 22. The system 11 and method 12 then operate substantially as described above to level the vehicle 10, except that a temperature input to the controller 32 may not be required when a position sensor is used to provide a load sense signal to the controller 32. As used herein, the term "load sense" includes all of the above described load sense arrangements and subsystems.

In summary, the system 11 and method 12 are customizable to meet any number of applications and allow complete control of any number of actuators. In a preferred embodiment, for example, the system 11 and method 12 are used to bring a vehicle, platform, or structure from an unleveled initial position into a level attitude position. Each actuator 22-25, 38 and 39 can be controlled independently of the other actuators in the system 11 through the capabilities of the controllers 32, 33 and 37. The actuators can be utilized together or utilized in sequence, and control of the actuators can be achieved in an automatic or manual mode. The system 11 and method 12 can include current sensing capabilities combined with temperature sense to monitor the current draw of each actuator to determine if the actuator is performing under a load, what the load is, and also if the actuator is at the end of its extension or retraction stroke. Utilizing the current sense also allows the program to determine if the actuator is extending or retracting. This current sensing can be done utilizing shunt resistors and bi-directional current sensing instrumentation amplifiers. This current sensing could also be done utilizing a hall-effect sensor configuration. The effects of inrush (which could be interpreted by the controllers as a large force or load being applied to the actuator) and back emf (the inductive forces created by the motor in operation can cause a spike in current in the opposite direction of operation when the motor is stopped, causing the controllers to sense the motor operating in the reverse direction and cause errors in the control algorithm) are eliminated in the current sense system. The system 11 and method 12 provide both a soft start and a soft stop for each actuator. This allows a ramp function to allow smooth initiation and termination of powered actuation when the controllers determine the actuator needs to either start of stop. Large capacitors may be installed in parallel with the output of the current sensing instrumental amplifiers to allow extra energy to be stored and dissipated at a rate that does not affect the control algorithm. The system 11 and method 12 is designed to require the customer to connect a battery, mount the actuators to the structure, mount controls where required, and run harnesses. This allows for quick installation and saves labor and assembly costs.

Although the principles, embodiments and operation of the present invention have been described in detail herein, this is not to be construed as being limited to the particular illustrative forms disclosed. It will thus become apparent to those skilled in the art that various modifications of the embodiments herein can be made without departing from the spirit or scope of the invention.

What is claimed is:

1. A method of controlling a plurality of electric actuators comprising the steps:
    providing an electric controller with two way electric communication with each of the electric actuators;
    applying an electrical current to each of the plurality of actuators to cause movement of each of the plurality of actuators;
    sensing the load carried by each of the plurality of actuators and communicating each load to the controller;
    maintaining the electrical current applied to each of the plurality of actuators to cause further movement of each of the plurality of actuators until the sensed load carried by each of the plurality of actuators exceeds a preset minimum load.

2. The method of controlling a plurality of actuators as set forth in claim 1, including the further step:
    sensing an X and Y direction attitude of an object to which the actuators are connected;
    communicating the sensed attitude as an input to the controller;
    moving the object from a not level attitude position to a level attitude position by operation of the actuators.

3. The method of controlling a plurality of actuators as set forth in claim 2, including the further step:
    sensing the amount of electrical current supplied to each actuator to sense the load carried by the actuator during the application of the electrical current.

4. The method of controlling a plurality of actuators as set forth in claim 3, including the further steps:
    applying an initial electrical current determined by the controller to the actuator to cause initial movement of the actuator;
    applying a further electrical current to the actuator to cause further movement of the actuator only when the sensed load carried by the actuator during the initial movement exceeds a preset minimum load;
        sensing the temperature of the actuator and combining the sensed temperature with the sensed electrical current to determine the load carried by the actuator;
        ignoring the amount of electrical current supplied to the actuator during an initial predetermined time period of the initial electrical current;
        sensing the amount of the initial electrical current supplied to the actuator to sense a condition in which the actuator reaches an end of its stroke.

5. The method of controlling a plurality of actuators as set forth in claim 1, including the further steps:
    providing a second electric controller with two way electric communication with a second plurality of electric actuators;
    applying an electrical current to each of the second plurality of actuators to cause movement of each of the second plurality of actuators;
    sensing the load carried by each of the second plurality of actuators and communicating each load to the second controller;
    maintaining the electrical current applied to each of the second plurality of actuators to cause further movement of each of the second plurality of actuators until the sensed load carried by each of the second plurality of actuators exceeds a preset minimum load;
    applying a further electrical current to two of the actuators to achieve a level attitude in one of the X and Y directions;
    applying a further electrical current to two of the actuators to achieve a level attitude in the other of the X and Y directions.

6. The method of controlling a plurality of actuators as set forth in claim 5, wherein:
    the step applying of applying a further electrical current to two of the actuators to achieve a level attitude in one of the X and Y directions includes applying the further electrical current to two actuators associated with one of the controllers; and
    the step of applying a further electrical current to two of the actuators to achieve a level attitude in the other of the X and Y directions includes applying the further electrical current to one actuator associated with one of the controllers and to one actuator associated with the other of the controllers.

7. The method of controlling a plurality of actuators as set forth in claim 1:
    wherein the controller controls the velocity of each actuator during a first and a second displacement of each actuator, and the velocity of each actuator during one of the displacements is substantially less than the velocity during the other displacement in order to create a soft start or a soft stop for each actuator.

8. The method of controlling a plurality of actuators as set forth in claim 1, further comprising the step of ignoring the amount of electrical current supplied to each actuator during an initial predetermined time period of the initial electrical current.

9. A method of controlling the attitude of a vehicle comprising the steps:
    (a) providing at least one electric controller in electric communication with a plurality of electric actuators and a user interface in electric communication with the electric controller and a temperature sensor in electric communication with the electric controller and a level sensor in electric communication with the electric controller;
    (b) selecting through the user interface between an automatic level mode and an automatic retract mode and a manual level mode and a manual retract mode;
    (c) when in the automatic level mode:
        applying an initial electrical current determined by the controller to each actuator to cause simultaneous extension movement of the actuators;

sensing temperature and communicating the temperature to the controller;
soft starting extension movement of each actuator;
sensing the electrical current supplied to each actuator and communicating the electrical current to the controller;
ignoring the electrical current supplied to each actuator for an in rush time period;
combining the sensed electrical current supplied to each actuator and the sensed temperature to determine a minimum ground contact load carried by each actuator;
soft stopping movement of each actuator that has achieved the minimum ground contact load until all actuators have achieved the minimum ground contact load;
soft starting further movement of each actuator by applying a further electrical current to the actuators to cause further movement of the actuator only when the sensed load carried by the actuators exceeds the preset minimum load;
sensing the attitude of the vehicle in the X and Y directions;
soft stopping movement of each actuator when a level attitude of the vehicle in the X and Y directions is sensed;
sensing the electrical current supplied to at least two of the actuators and combining the sensed current with the sensed temperature to determine the minimum ground contact load carried by each of the two actuators;
ignoring the electrical current supplied to each of the two actuators for an in rush time period;
combining the sensed electrical current supplied to each of the two actuators and the sensed temperature to determine the a minimum ground contact load carried by each of the two actuators;
ending the automatic level mode;
(d) when in the automatic retract mode:
applying an initial electrical current determined by the controller to each actuator to cause simultaneous retraction movement of the actuators;
sensing temperature and communicating the temperature to the controller;
soft starting retraction movement of each actuator;
sensing the electrical current supplied to each actuator and communicating the electrical current to the controller;
ignoring the electrical current supplied to each actuator for an in rush time period;
combining the sensed electrical current supplied to each actuator and the sensed temperature to determine a full retract load for each actuator;
stopping movement of each actuator that has achieved the full retract load,
ending the automatic retract mode when all actuators have achieved the full retract load;
(e) when in the manual level mode:
applying an initial electrical current determined by the controller to each actuator to cause simultaneous extension movement of the actuators;
sensing temperature and communicating the temperature to the controller;
soft starting extension movement of each actuator;
sensing the electrical current supplied to each actuator and communicating the electrical current to the controller;
ignoring the electrical current supplied to each actuator for an in rush time period;
combining the sensed electrical current supplied to each actuator and the sensed temperature to determine the a minimum ground contact load carried by each actuator;
soft stopping movement of each actuator that has achieved the minimum ground contact load until all actuators have achieved the minimum ground contact load;
soft starting further movement of each actuator by applying a further electrical current to the actuators in response to an operator command to cause further movement of the actuator only when the sensed load carried by the actuators exceeds the preset minimum load;
communicating the attitude of the vehicle in the X direction;
soft stopping movement of at least one actuator in response to operator command when a level attitude of the vehicle in the X direction is communicated;
communicating the attitude of the vehicle in the Y direction;
soft stopping movement of at least one actuator in response to operator command when a level attitude of the vehicle in the Y direction is communicated;
ending the manual level mode;
(f) when in the manual retract mode:
applying an initial electrical current determined by the controller to each actuator to cause simultaneous retraction movement of the actuators;
sensing temperature and communicating the temperature to the controller;
soft starting retraction movement of each actuator;
sensing the electrical current supplied to each actuator and communicating the electrical current to the controller;
ignoring the electrical current supplied to each actuator for an in rush time period;
combining the sensed electrical current supplied to each actuator and the sensed temperature to determine a full retract load for each actuator;
stopping movement of each actuator that has achieved the full retract load;
stopping the manual retract mode when all actuators have achieved a full retract load.

10. A multiple electric actuator system comprising:
a plurality of actuators mounted on an object to be moved;
an input/output operator interface;
a controller;
communication links extending among and communicating with the controller and the input/output operator interface and each of the actuators to actuate the plurality of actuators in response to operator input to control movement of the object;
a temperature sensor; and
a load sensor for determining the load carried by each actuator and communicating the load to the controller;
wherein the controller is configured to determine a modified load based in part on the load communicated to the controller and based in part on a temperature reading from the temperature sensor, such that the controller is able to control electric current applied to each of the plurality of actuators based on the modified load.

11. The multiple electric actuator system as set forth in claim 10, including a second plurality of actuators, a second controller, additional communication links extending among and communicating with the second controller and the second plurality of actuators and the first controller and with a temperature sensor to actuate the second plurality of actuators in response to operator input to control movement of the object.

12. The multiple electric actuator system as set forth in claim 11, including a load sensor for determining the load carried by each of the second plurality of actuators and communicating the load to the second controller.

13. The multiple electric actuator system as set forth in claim 12, including a third plurality of actuators, a third controller, additional communication links extending among and communicating with the third controller and each of the third plurality of actuators and one of the first and second controllers and with a temperature sensor to actuate the third plurality of actuators in response to operator input to control movement of the object.

14. The multiple electric actuator system as set forth in claim 13, including a load sensor for determining the load carried by each of the third plurality of actuators and communicating the load to the third controller, and the third controller communicating with the second controller.

15. The multiple electric actuator system as set forth in claim 10, wherein each of the load sensors is a current sensor that senses the electrical current supplied to its associated actuator, and each of the current sensors communicates its sensed current to its associated controller.

16. The multiple electric actuator system as set forth in claim 10, further including a level sensor for sensing the attitude of the object, the level sensor provides a level sense signal as an input to each controller, and the controller operates to extend the actuators to move the object from a not level attitude to a level attitude only when the load carried by each actuator exceeds a predetermined minimum load.

17. The multiple electric actuator system as set forth in claim 10, wherein each electric actuator is an electro-hydraulic actuator or an electro-mechanical actuator.

18. The multiple electric actuator system as set forth in claim 10, wherein the system is a central controller system in which all of the actuators included in the system are operated by a single controller.

19. The multiple electric actuator system as set forth in claim 10, wherein the system is a distributed controller system in which each of the actuators included in the system is operated by a separate controller.

20. The multiple electric actuator system as set forth in claim 10, wherein the system is an object leveling system.

21. The multiple electric actuator system of claim 10, wherein a shunt resistor is associated with each actuator allowing the controller to monitor the current draw of each actuator.

22. The multiple electric actuator system of claim 20, wherein the plurality of actuators include a manual level operation mode and an automatic level operation mode.

23. A system comprising:
a plurality of electric actuators;
an electric controller in two way electric communication with each of the electric actuators, wherein the electric controller is configured to apply an electrical current to each of the plurality of actuators to cause movement of each of the plurality of actuators;
a load sensor for determining the load carried by each of the plurality of actuators and communicating each load to the electric controller;
wherein the electric controller is configured to maintain the electrical current applied to each of the plurality of actuators to cause further movement of each of the plurality of actuators until the sensed load carried by each of the plurality of actuators exceeds the preset minimum load.

* * * * *